United States Patent [19]
Wirth et al.

[11] Patent Number: 5,651,433
[45] Date of Patent: Jul. 29, 1997

[54] FLUID OPERATED OSCILLATION DAMPER

[75] Inventors: Alfred Wirth; Andreas Förster, both of Schweinfurt; Günther Handke, Euerbach; Andreas Zietsch, Röthlein, all of Germany

[73] Assignee: Fichtel & Sachs AG, Schweinfurt, Germany

[21] Appl. No.: 500,607

[22] Filed: Jul. 11, 1995

Related U.S. Application Data

[63] Continuation-in-part of Ser. No. 91,664, Jul. 14, 1993, Pat. No. 5,462,142.

[30] Foreign Application Priority Data

Jul. 15, 1992 [DE] Germany ............................. 9209505 U
Jul. 12, 1994 [DE] Germany ............................. 44 24 437.1

[51] Int. Cl.[6] ............................. F16F 9/32; B60G 17/08
[52] U.S. Cl. ................... 188/299; 188/322.13; 220/725; 403/202; 403/365
[58] Field of Search ............................. 188/315, 299, 188/322.12, 322.19, 322.13; 138/96 R; 220/724, 725, 86.4; 403/202, 365; 280/707, 714

[56] References Cited

U.S. PATENT DOCUMENTS

| | | | |
|---|---|---|---|
| 5,163,706 | 11/1992 | Maguran, Jr. et al. | 188/299 X |
| 5,301,412 | 4/1994 | Hahn et al. | 188/299 X |
| 5,398,787 | 3/1995 | Woessner et al. | |

FOREIGN PATENT DOCUMENTS

| | | |
|---|---|---|
| 0356937 | 3/1990 | European Pat. Off. . |
| 0510741 | 10/1992 | European Pat. Off. . |
| 2113387 | 9/1972 | Germany . |
| 3432728 | 3/1986 | Germany . |
| 4024920 | 2/1992 | Germany . |
| 4139671 | 3/1993 | Germany . |
| 4406918 | 9/1994 | Germany . |
| 2247933 | 3/1992 | United Kingdom . |

*Primary Examiner*—Josie Ballato
*Attorney, Agent, or Firm*—Nils H. Ljungman and Associates

[57] ABSTRACT

A fluid oscillation damper is provided with an electromagnetically controlled valve for varying the damping force of the oscillation damper. The electromagnetically controlled valve is housed within a compartment confined by two housing parts. A first housing part is fastened to a container of the oscillation damper. A second housing part is fastened to the first housing part. Both housing parts are nonreleasably interconnected. The electromagnetically controlled valve is actuated by an electromagnetic coil. The electromagnetic coil is provided with a ferromagnetic core. This ferromagnetic core is constituted by a plurality of components. These components are assembled so as to reduce the magnetic resistance for the magnetic flux.

79 Claims, 10 Drawing Sheets

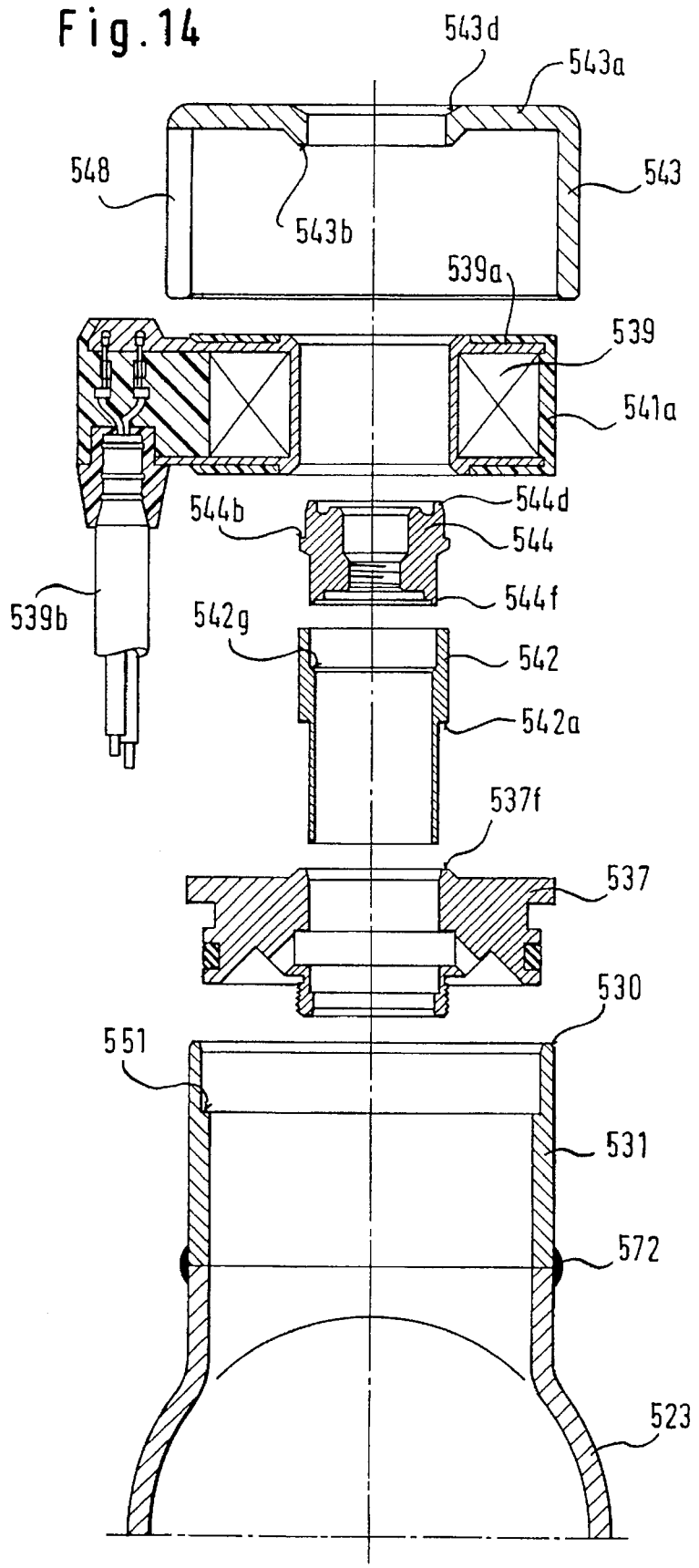

FLUID OPERATED OSCILLATION DAMPER

CROSS-REFERENCE TO RELATED APPLICATION

The present application is a continuation in part of U.S. patent application Ser. No. 08/091,664, filed on Jul. 14, 1993 by Günther Handke, Alfred Wirth and Andreas Zietsch, entitled "Fluid Operated Damper With Nonreleasable Cover Unit for Electromagnetic Valve," which issued as U.S. Pat. No. 5,462,142 on Oct. 31, 1995.

BACKGROUND OF THE INVENTION

In modern motor cars hydraulic oscillation dampers are provided which permit variation of the damping behaviour. Such hydraulic oscillation dampers are provided with an electromagnetically controlled valve unit. This valve unit is provided in a flow path connecting two working chambers the volume of which is altered in opposite senses during movement of a piston rod with respect to the container of the respective oscillation damper. This flow path is in parallel with a continuously open throttled flow path. By variation of the cross-sectional area of the flow path through the electromagnetically controlled valve unit, the damping behaviour of the oscillation damper can be varied. The variation of the damping behaviour may be a continuous or a step-wise variation. The electromagnetically controlled valve unit is preferably fastened to the outer side of a container of the oscillation damper. Electromagnetic and fluidic components of the valve unit are accommodated within a compartment attached to the outer side of the container.

STATEMENT OF THE PRIOR ART

According to German patent publication DE-OS 40 24 920 a tubular basic housing unit is mounted to the external side of the container of an oscillation damper. A cover unit is fastened to the free end of the basic housing unit. For the connection of the cover unit an interconnecting sleeve is used. This interconnecting sleeve is axially movable along the tubular basic housing unit against an abutment ring fixed in a circumferential groove of the tubular basic housing unit. The interconnecting sleeve is provided with internal thread means which can be screwed onto external thread means of the cover unit until the interconnecting sleeve abuts the abutment ring. Such, the cover unit may be pressed into sealing engagement with the basic housing unit.

It is to be noted that the German publication DE-OS 40 920 is commonly owned with the present application.

The above-mentioned older construction has two drawbacks:

On the one hand, the interconnecting sleeve can be released by any hobbyist, and it cannot be expected that the necessary torque is applied when reassembling the cover unit and the basic housing unit by screwing the interconnecting sleeve with respect to the cover unit. Such, the expected tightness cannot be guaranteed after reassembling. Inadequate tightness may lead to a reduction in damping power owing to the loss of the damping medium within the valve unit.

A further drawback comes up, when pressurized gas is contained within the oscillation damper. In this case, the gas pressure may be reduced when dissembling the cover unit and the housing unit. A reduction of the gas pressure leads to the risk of foaming of a liquid within the oscillation damper during operation. For the hobbyist or other unauthorized person it is scarcely possibly to establish gas pressure again within the oscillation damper after reassembling the cover unit and the basic housing unit.

A further disadvantage may occur with the above-mentioned construction, when by the connection of the cover unit and the basic housing unit a ferromagnetic flange portion is located inside the compartment confined by the basic housing unit and the cover unit. In such a construction the loosening of the connection between the basic housing unit and the cover unit and the reassembling of these units after a preceding disassembling can lead to a wrong positioning of components within the compartment. E.g. the abutment faces for biasing springs may be wrongly located so that the respective biasing forces are wrongly adjusted and the damping power is different from the expected damping power. So it may occur that the expected hardest damping characteristic cannot be selected.

OBJECT OF THE INVENTION

It is an object of the present invention to provide an electromagnetically controlled valve unit for a fluid operated oscillation damper, in which the safety level is increased by making a disassembly of the housing units confining the electro-magnetic and fluidic components impossible or at least very difficult so that misadjustment of the housing units and of the electromagnetic and fluidic components contained therein is avoided.

A further object is to obtain a simplified design and to allow simple assembling methods.

A further object of the invention is to warrant the tightness of the compartment confining the electromagnetic and fluidic components.

A further object is to prevent hobbyists, amateurs and other unauthorized people from access to the electromagnetic and fluidic componnents inside the compartment, such as to prevent unauthorized modification of the damping characteristics of the oscillation damper.

SUMMARY OF THE INVENTION

In consideration of at least a part of the above-mentioned objects the invention provides a fluid operated oscillation damper with an electromagnetically controlled valve unit for varying the damping force of the oscillation damper. The valve unit comprises a plurality of fluidic and electromagnetic valve unit components. At least a part of these fluidic and electromagnetic valve unit components are accommodated within a valve unit compartment of the oscillation damper. The valve unit compartment is confined by compartment confining means. These compartment confining means comprise at least two housing units. One of the housing units is a basic housing unit attached to a part of the oscillation damper. A further one of the housing units is a cover unit attached to the basic housing unit. The cover unit is nonreleasably connected by nonreleasable connection means to the basic housing unit.

By the term "fluid operated oscillation damper" hydraulic, pneumatic and hydropneumatic oscillation dampers are included. Preferably, the damping force is generated by a hydraulic medium flowing through throttled passages. Correspondingly, the term "fluidic valve unit components" is to comprise all valve components which control flow of hydraulic or pneumatic medium.

By the nonreleasable connection of the housing units a nonauthorized person is prevented to disassemble the housing units and the electromagnetic and fluidic valve unit components accommodated therein. Moreover, the sealing measures provided by the manufacturer cannot be damaged by unauthorized persons. Moreover, a damping power adjustment can no longer be manipulated by unauthorized persons.

The cover unit may be connected to the basic housing unit by positively interengaging locking means. These positively interengaging locking means can be obtained by plastic deformation of the respective materials of the housing unit at the location of engagement. These materials may comprise combinations of metal-metal, plastics material-plastics material or metal-plastics material.

According to a first embodiment the basic housing unit and the cover unit have respective sleeve-shaped portions overlapping each other in an axial direction along a common axis. These sleeve-shaped portions are connected with each other. One of these sleeve-shaped portions is a radially inner sleeve-shaped portion, and the other one of these sleeve-shaped portions is a radially outer sleeve-shaped portion.

In case of such an arrangement of a radially inner sleeve-shaped portion and a radially outer sleeve-shaped portion the radially inner sleeve-shaped portion may be provided with a circumferential groove within a radially outer surface thereof, and the radially outer sleeve-shaped portion may be provided with a radially inward displaced circumferential bead engaged into said circumferential groove. The circumferential groove may be preshaped before combining the sleeve-shaped portions such that the material of the radially outer sleeve-shaped portion may then be dislocated radially inwards into the preshaped groove such as to form the circumferential bead. Alternatively, it is also possible to preassemble the sleeves before shaping the circumferential groove and to thereafter provide the circumferential groove simultaneously with shaping the circumferential bead. When talking of a circumferential groove, this term should include a continuous circumferential groove as well as a circular series of individual depressions. Moreover, the term "circumferential bead" should also cover both a continuous bead and a circular arrangement of individual, radially inwardly directed projections obtained by deformation of the radially outer sleeve at the respective locations.

It is also possible that the radially inner sleeve-shaped portion is provided with radially outward directed locking flange means and that the radially outer sleeve-shaped portion is provided with radially inward directed locking flange means bent behind the radially outward directed locking flange means. At least one of the radially outward directed locking flange means and the radially inward directed locking flange means may be circumferentially continuous locking flange means. Alternatively, one or both flange means may be provided by respective series of flange forming sections separated from each other in circumferential direction by respective gaps.

It is further possible that the radially inner sleeve-shaped portion and the radially outer sleeve-shaped portion are locked to each other by a locking ring located radially between a radially outer circumferential face of the radially inner sleeve-shaped portion and a radially inner circumferential face of the radially outer sleeve-shaped portion. The locking ring may be embossed into both the radially inner and the radially outer circumferential face. During the connecting phase one may position the locking ring between a smooth radially outer circumferential face and a smooth radially inner circumferential face and exert radial pressure onto the radially outer sleeve portion such as to simultaneously emboss the locking ring into both adjacent circumferential faces. Alternatively, it is also possible to preshape a groove in the radially outer face, to insert the locking ring therein, to assemble the radially inner and the radially outer sleeve portion with the locking ring being located between the respective radially outer and radially inner circumferential faces and to thereafter urge the material of the radially outer sleeve portion towards the radially inner sleeve portion on both axial sides of the locking ring.

Preferably, the radially inner sleeve-shaped portion is a part of the basic housing unit, while the radially outer sleeve-shaped portion is a part of the cover unit. This is due to the fact that normally the materially of the basic housing unit is a relatively thick metallic tube material which can easily resist the pressure for obtaining the connection.

According to a still further embodiment the basic housing unit and the cover unit have respective radially outer circumferential faces circumferentially extending about a substantially common axis and axially adjacent each other and both said circumferential faces of the basic housing unit and of the cover unit are axially overlapped by an interconnecting sleeve. This interconnecting sleeve is in locking engagement with both circumferential faces of the basic housing unit and the cover unit, respectively. In such case, the interconnecting sleeve may be locked to at least one of the radially outer circumferential faces by a ring member effecting a locking engagement in at least one axial direction. Locking engagement "in at least one axial direction" means that the interconnecting sleeve is movable with respect to said one circumferential face in axial direction unitl abutting a respective abutment face provided on said on circumferential face.

Further, the interconnecting sleeve may be locked to at least one of the radially outer circumferential faces by a circumferential radially inward directed locking bead engaging into a circumferential locking groove provided in said radially outer circumferential surface.

Preferably, one may combine the two alternatives such that the interconnecting sleeve is shaped for entering into the abutting engagement with abutment means of a first one of the circumferential faces when being brought in overlapping condition with respect to the other one of the radially outer circumferential faces during an assembling phase and that hereupon, the locking bead is generated on the interconnecting sleeve such as to enter into the locking groove. The above-mentioned alternatives for providing the locking groove (preshaping or simultaneous shaping with the shaping of the locking bead) may again be applied. Both the locking groove and the locking bead may again be continuous or constituted by individual depressions and projections, respectively, in circular arrangement.

Sealing means may be provided between the basic housing unit and the cover unit. These sealing means may be maintained under sealing pressure by the nonreleasable connection means.

The basic housing unit may have a tubular shape and may be fastened by one of its ends to a container tube member of the oscillation damper. The other end of the tubular basic housing unit may then be connected to the cover unit. The tubular basic housing unit may e.g. be fastened to the outer circumferential face of the container tube member by welding, such as to have its axis intersecting the axis of the container tube member with a substantially 90° angle. Preferably, the basic housing unit is connected to the container tube member before being assembled with and connected to the cover unit. After connecting the basic housing unit to the container tube member the cover unit is connected thereto. The electromagnetic and fluidic components as defined above may be inserted into the basic housing unit or/and into the cover unit before assembling the cover unit and the basic housing unit.

The cover unit may be partially made of metallic material or ferromagnetic material and partially made of plastics material. The nonreleasable connecting means are preferably provided between the basic housing unit and metallic material of the cover unit. The cover unit may be obtained by a injection moulding process in which the preshaped metallic material is inserted into an injection mould during the injection phase.

If the basic housing unit and the cover unit have a common axis, one may accommodate within the cover unit an annular electromagnetic coil around the axis and an axially movable armature member inside a central space surrounded by the annular electromagnetic coil.

For providing a strong magnetic field acting onto the armature and concentrating the field in the area of the armature with the field lines being directed in axial direction at the location of the armature, one may provide ferromagnetic core means toroidally extending around the annular electromagnetic coil. These ferromagnetic core means may comprise a ferromagnetic flange portion provided axially between the annular electromagnetic coil and the basic housing unit. This ferromagnetic flange portion may be an iron-made flange portion. The electromagnetic flange portion represents a relatively rigid structural part which may also be used for stiffening at least one of the basic housing unit and the cover unit in radial direction. This is particularly true, if the ferromagnetic flange portion fully fills the respective internal cross-sectional area of the basic housing unit or/and the cover unit. It is, therefore, most desirable that the nonreleasable connecting means or at least part of them are provided at or axially adjacent the ferromagnetic flange portion. Thus, reshaping operations by radial pressure onto the radially outer side of the cover unit or/and the basic housing unit may be made in areas stiffened by the ferromagnetic flange portion, and undesirable deformations of the cover unit or/and the basic housing unit are avoided.

The ferromagnetic core means may further comprise a ferromagnetic jacket surrounding the annular electromagnetic coil and integral with a ferromagnetic end wall adjacent an end face of the annular electromagnetic coil remote from the ferromagnetic flange portion. This ferromagnetic jacket may provide a portion of the cover unit nonreleasably connected to the basic housing unit.

Preferably, the ferromagnetic end wall has a central opening axially aligned with the central space of the annular coil. Then, a central ferromagnetic core member may be located inside the central opening and extend into the central space. The central opening may be closed by a plastics material layer of the cover unit. This plastics material layer may cover the ferromagnetic end wall and part of the ferromagnetic jacket.

The plastics material layer of the cover unit may extend through openings of the ferromagnetic jacket and be integral with a plastics material jacket surrounding the annular electromagnetic coil on a radially outer circumferential side thereof. In case of injection moulding the ferromagnetic jacket and the electromagnetic coil are inserted into the injection mould, possibly in combination with further internal components.

The ferromagnetic flange portion may be in axial engagement with a substantially axially directed engagement face of the ferromagnetic jacket. Thus, a correct relative positioning of the ferromagnetic flange portion and the ferromagnetic jacket is obtained and simultaneously, the subassembly comprising the ferromagnetic flange portion and the ferromagnetic jacket may be radially or/and axially positioned with respect to one of the basic housing unit and the cover unit. Moreover, the cover unit may be correctly positioned with respect to the basic housing unit through the ferromagnetic flange portion or/and the ferromagnetic jacket.

The ferromagnetic flange portion may be maintained in axial engagement with the engagement face by the nonreleasable connecting means. Such, the magnetic circuit is positively closed at the interface between the ferromagnetic flange portion and the ferromagnetic jacket.

The ferromagnetic flange portion may further be axially supported by a valve components housing which as again axially supported by and inside the basic housing unit and open towards the central space such as to expose the valve components inside the valve components housing to the armature member.

Sealing means may be provided for sealing the valve components housing with respect to the ferromagnetic flange portion and the basic housing unit. These sealing means may be maintained under sealing pressure by the non-releasable connection means.

The plastics material jacket may form together with a radially outward open coil carrier a coil housing for the annular electromagnetic coil.

The cover unit may be provided with pretension application means permitting pretensioning of the cover unit towards the basic housing unit before and during connecting the cover unit to the basic housing unit. Such, a pretensioning device may be applied to the cover member, on the one hand, and to the oscillation damper, on the other hand, for pretensioning the cover unit and the basic housing unit toward each other.

Moreover, the basic housing unit may be combined with further pretension application means in this case, the pretension may be applied to the basic housing unit and to the cover unit without loading the container member of the oscillation damper by pretensioning forces.

Both the cover unit and the interconnecting sleeve may be provided with pretension application means permitting pretensioning of the cover unit towards the basic housing unit after having locked said interconnecting sleeve to the radially outer face of the basic housing unit and before locking it to the radially outer surface of the cover unit. This is a preferred embodiment because no reshaping forces act onto the basic housing unit when making the nonreleasable connection.

The invention further concerns a method for assembling a fluid operated oscillation damper with an electromagnetically controlled valve unit of the above described type.

This method comprises fastening the basic housing unit to a part of the oscillation damper, inserting the electromagnetic and fluidic valve unit components into at least one of the basic housing unit and the cover unit, pretensioning the cover unit towards the basic housing unit and nonreleasably connecting the cover unit to the basic housing unit while maintaining pretension between them. The radial deformation of the respective housing portions for providing the connection means may be obtained by conventional rolling or caulking.

The fluid pressure forces occurring within the compartment may be positively transmitted to the basic housing unit. E.g., fluid pressure forces may be transmitted to the ferromagnetic flange portion, from the ferromagnetic flange portion to the cover unit and from the cover unit to the basic housing unit through the connection means. The connection means are such that they can be easily obtained in the manufacturing plants. They cannot be opened and reclosed by an unauthorized person. In case of need of repair the manufacturer or other authorized persons can, nevertheless, easily release the connection means and apply them again after repair such that no damaging of the internal electromagnetic and fluidic components is to be expected, more particularly, damaging to the magnetic coil, the casing thereof and the armature is avoided.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to the embodiments shown in the accompanying drawings in which

FIG. 14 shows an explosive view of the components of the embodiment of FIG. 13 during assembling.

DETAILED DESCRIPTION OF THE PREFERRED EMBODIMENTS

Figure 1:
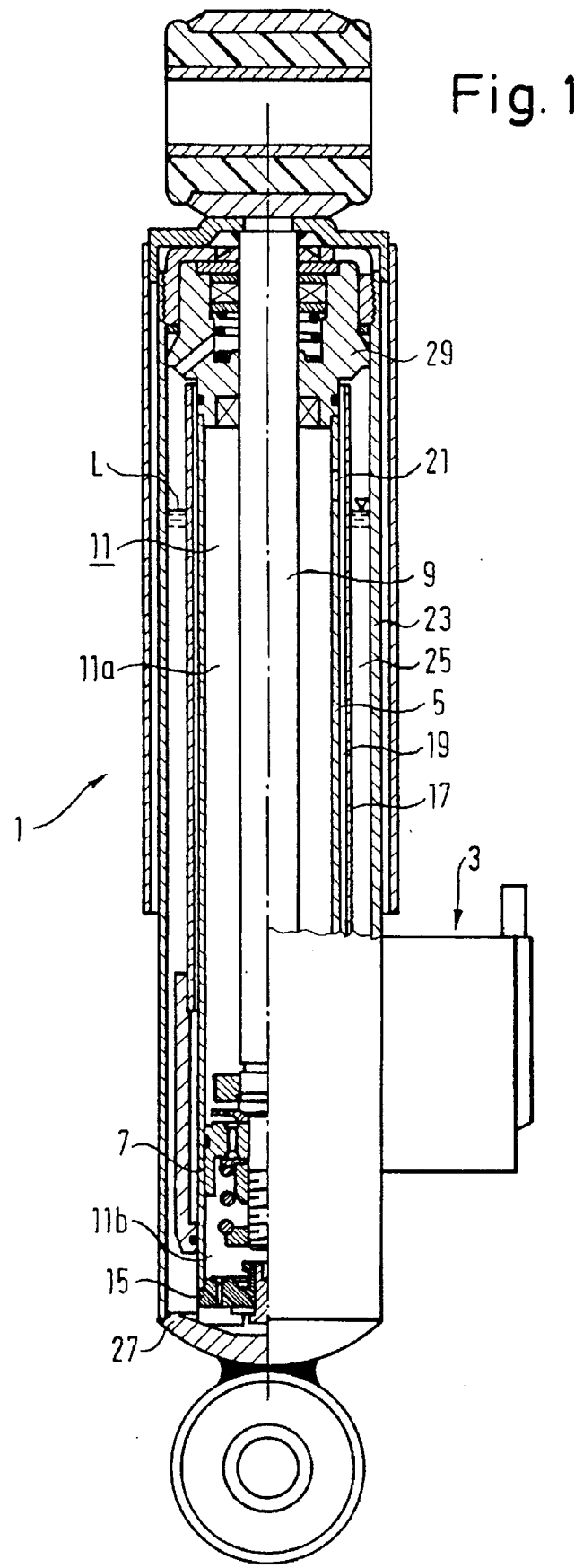
FIG. 1 shows an overal view of an oscillation damper or vibration damper of a motor vehicle with a variable damping power.

FIG. 1 shows a complete oscillation damper 1, a detailed illustration of the valve unit 3 being omitted for the sake of clarity. The oscillation damper 1 consists essentially of a pressure pipe 5 in which a piston 7 on a piston rod 9 divides a working space 11 into an upper or piston-rod-side working chamber 11a and a lower or piston-rod-remote working chamber 11b. A bottom valve unit 15 closes the pressure pipe 5 at the lower end thereof. A fluid path 19 is formed between the pressure pipe 5 and an intermediate pipe 17, said intermediate pipe 17 being arranged concentrically with respect to the pressure pipe 5. A connecting orifice 21 in the pressure pipe 5 connects the upper working chamber 11a with the fluid path 19. A compensating chamber 25 is confined between the intermediate pipe 17 and a portion of the pressure pipe 5, on the one hand, and a container pipe 23, on the other hand. This compensating chamber 25 is axially limited by a base member 27 and a piston rod guiding and sealing unit 29. The working space 11 is separated by the piston 7 into the upper working chamber 11a and the lower working chamber 11b. Both the upper and the lower working chamber are filled with a liquid. The compensating chamber 25 is also filled with damping liquid up to the level L and contains a possibly pressurized gas above the level L. The bottom valve unit 15 provides communication between the working chamber 11b and the compensating chamber 25. The piston 7 provides communication between the lower working chamber 11b and the upper working chamber 11a. According to an illustrative example the oscillation damper works as follows: When the piston rod 9 moves upwards, a high flow resistance occurs across the piston 7 and a high pressure is generated in the upper working chamber 11a. Liquid from the upper working chamber 11a flows through said high flow resistance into the lower working chamber 11b. As the piston rod 9 moves outward of the working space 11, the available volume within the working space 11 is increased. Therefore, liquid can flow from the compensating chamber 25 through the bottom valve unit 15 into the lower working chamber 11b. The flow resistance through the bottom valve unit 15 is small in this phase of operation. The movement of the piston rod 9 with respect to the pressure pipe 5 is damped.

On inward movement of the piston rod 9 fluid flows from the lower working chamber 11b through the piston 7 into the upper working chamber 11a. The flow resistance across the piston 7 is relatively small and the flow resistance across the bottom valve unit 15 is relatively large. Therefore, a considerable pressure exists even within the upper working chamber 11a. The volume within the working space 11 is reduced by the piston rod 9 entering into the working space 11. Thus, damping liquid must flow from the lower working chamber 11b through the bottom valve unit 15 into the compensating chamber 25. In this phase of operation the flow resistance through the bottom valve unit 15 is high such that a high pressure occurs within the lower working chamber 11b and also within the upper working chamber 11a.

By the connecting orifice 21 and the fluid path 19 the upper working chamber 11a is connected with the compensating chamber 25 via the valve unit 3. This is shown in more detail in FIG. 2, which will be described later. As long as the valve unit 3 is closed, the bypass established by the connecting orifice 21, the fluid path 19 and the valve unit 3 is also closed. This is the hardest mode of operation of the oscillation damper. When, however, the valve unit 3 is more or less opened, the bypass is also open. As a result thereof the following behaviour exists: On upward movement of the piston rod 9 liquid can flow from the highly pressurized upper working chamber 11a not only across the piston 7 providing a high flow resistance but also from the working chamber 11a through the bypass 21,19,3 to the compensating chamber 25. Such, the damping force is reduced.

When the piston rod 9 moves downwards, there exists again a high pressure within the upper working chamber 11a, as described above. Therefore, damping liquid can flow from the upper working chamber 11a through the bypass 21,19,3 to the compensating chamber 25. This means that the damping liquid which must be expelled from the working space 11 as a result of the reduced volume therein does not only escape through the bottom valve unit 15 to the compensating chamber 25 but can also partially escape through the bypass 21,19,3 to the compensating chamber 25. Such, the damping force is again reduced by the open bypass 21,19,3. It is to be noted that the direction of flow of the damping liquid through the bypass 21,19,3 is the same, both on upward movement and downward movement of the piston rod 9 with respect to the pressure pipe 5. By increasingly closing the flow resistance through the valve unit 3 the damping force can be increased both for upward and downward movement of the piston rod 9, and by increasingly opening the valve unit 3 the damping force can be reduced both for upward movement and downward movement of the piston rod 9. It is possible to selectively open and close the valve unit or to continuously vary the flow resistance through the valve unit 3.

Figure 2:
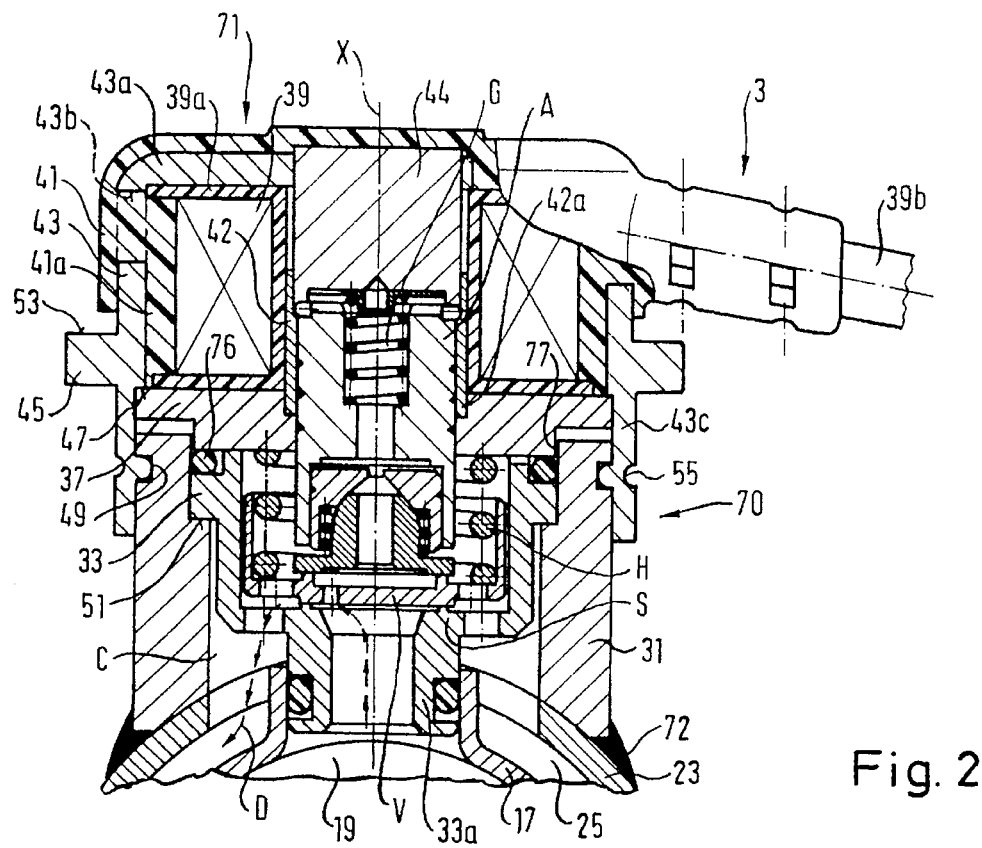
FIG. 2 shows a first embodiment of a valve unit for an oscillation damper according to FIG. 1.

In FIG. 2 one can again see the fluid path 19 and the compensating chamber 25, which are interconnectable through the valve unit 3 with cable 39b. The fluid path 19 is connected to the upper working chamber 11a as shown in FIG. 1. The flow direction from the fluid path 19 to the compensating chamber 25 across the valve unit 3 is indicated in FIG. 2 by the dotted line D provided with arrows indicating the flow direction both for inward movement and outward movement of the piston rod 9 with respect to the pressure pipe 5. One can see in FIG. 2 a valve member V which can be lifted with respect to a valve seat S, such as to open the flow path D from the fluid path 19 to the compensating chamber 25. For more details as to the function of the valve unit 3 it is referred to the above-mentioned German publication DE-OS 40 24 920Al published on 13 Feb. 1992, to the corresponding U.S. patent application Ser. No. 07/738,155 filed on 30 Jul. 1991 (now abandoned), from which the following U.S. patent applications were continuations: Ser. No. 08/071,994 (now abandoned); Ser. No. 08/157,837 (now abandoned); and Ser. No. 08/238,806 (which issued to Felix Woessner on Aug. 8, 1995, as U.S. Pat. No. 5,439,085).

Reference is also made to the corresponding British Publication GB 22 47 933A published on 18 Mar. 1992. For explaining the principles of the present invention it is sufficient to say that the valve member V is urged downward in the closing sense towards the valve seat S by a helical compression spring H and that the valve member V can be lifted in response to upward movement of an electromagnetic armature member A. This armature member A is biased in downward direction by a helical compression spring G and can be lifted by energization of a magnetic coil 39 which is energized through a current supply cable 39b. Further details of the construction and operation can be taken from the above-mentioned specifications.

The valve unit 3 comprises a housing 70. This housing 70 is composed by a basic housing tube 31 and a cover unit 71. The basic housing tube 31 is welded at 72 to the container pipe 23. The cover unit 71 is fastened to the basic housing tube 31.

A pot-shaped valve components housing 33 is inserted into the basic housing tube 31 and is axially located on a shoulder face 51 inside the basic housing tube 31. Various valve components are located inside the valve components housing 33. The lower end of the valve components housing 33 is shaped as a tube section 33a, which provides the valve seat S and is sealingly connected to the fluid path 19.

The cover unit 71 comprises an iron jacket 43 integral with an iron end wall 43a. The iron jacket 43 and the iron end wall 43a are coated with a plastic layer 41. An annular electromagnetic coil 39 is housed within the iron jacket 43. This electromagnetic coil 39 is carried by a coil carrier 39a, which is annular about an axis X and is open in radial outward direction. The coil carrier 39a is closed in radially outward direction by a plastics material 41a integral with the plastic layer 41 through openings 43b of the iron jacket 43. The plastics layer 41 and the plastics material 41a are integrally moulded by injection moulding with the iron jacket 43, the iron end wall 43a integral therewith and the electromagnetic coil 39 and the coil carrier 39a being inserted into the injection mould.

A ferromagnetic core 44 is inserted into a central opening of the iron end wall 43a and covered by the plastics layer 41. An iron flange portion 37 is provided at the lower side of the electromagnetic coil 39 and is engaged with a shoulder face 47 of the iron jacket 43. A pole tube 42 is seated within an annular recess 42a of the iron flange portion 37. The pole tube 42 is sealingly connected to the iron flange portion 37 and to the ferromagnetic core 44. The armature A is guided within the pole tube 42. The pole tube 42 is made of nonmagnetic material so that the magnetic field lines are deflected by the lower end of the pole tube 42. The iron jacket 43, the iron end wall 43a, the ferromagnetic core 44 and the iron flance portion 37 form a ferromagnetic core arrangement which toroidally surrounds the electromagnetic coil 39.

The cover unit 71 is fastened to the basic housing tube 31 by a sleeve-shaped extension 43c of the iron jacket 43 This sleeve-shaped extension 43c axially overlaps the basic housing tube 31. The sleeve-shaped extension 43c is fastened to the basic housing tube 31 by a circumferential bead 55 being embossed into a circumferential groove 49 on the radially outer face of the basic housing tube 31. The iron jacket 43 is provided with a pretensioning flange 45. The pretensioning flance 45 offers a pretension face 53. The cover unit 71 can be pretensioned in downward direction as shown in FIG. 2 toward the basic housing tube 31 by a pretensioning tool engaging the container pipe 23, on the one hand and the pretensioning face 53, on the other hand Such, the iron flange portion 37 is pressed against the upper end of the valve components housing 33, the valve components housing 33 is engaged with the shoulder face 51 of the basic housing tube 31, and the iron flange portion 37 is engaged with the shoulder face 47 of the iron jacket 43. The helical compression spring H is compressed between the iron flange portion 37 and the valve member V, which is seated on the valve seat S.

While maintaining this pretension of the cover unit 71 against the basic housing tube 31, the bead 55 is rolled or caulked into the circumferential groove of the basic housing tube 31 so that after removing the pretensioning tool an internal pretension is maintained. A sealing ring 76 is, therefore, maintained in sealing engagement with the valve components housing 33, the iron flange portion 37 and the basic housing tube 31. Such, the compartment C confined by the basic housing tube 31 and the cover unit 71 is sealed against atmosphere. All components of the valve unit 3 are positioned with respect to each other, and the helical compression spring H as well as the helical compression spring G and further springs are biased to the desired degree.

It is to be noted that the upper end of the basic housing tube 31 is radially engaged at 77 with the iron flange portion 37 such that when rolling or caulking the bead 55 into the groove 49, no deformation of the basic housing tube 31 and of the iron jacket 43 can occur.

The electromagnetic coil 39 is completely separated from the liquid within the compartment C by the iron flange portion 37. The pretension during connecting the cover unit 71 and the basic housing tube 32 is selected such that no play can occur.

Figure 3:
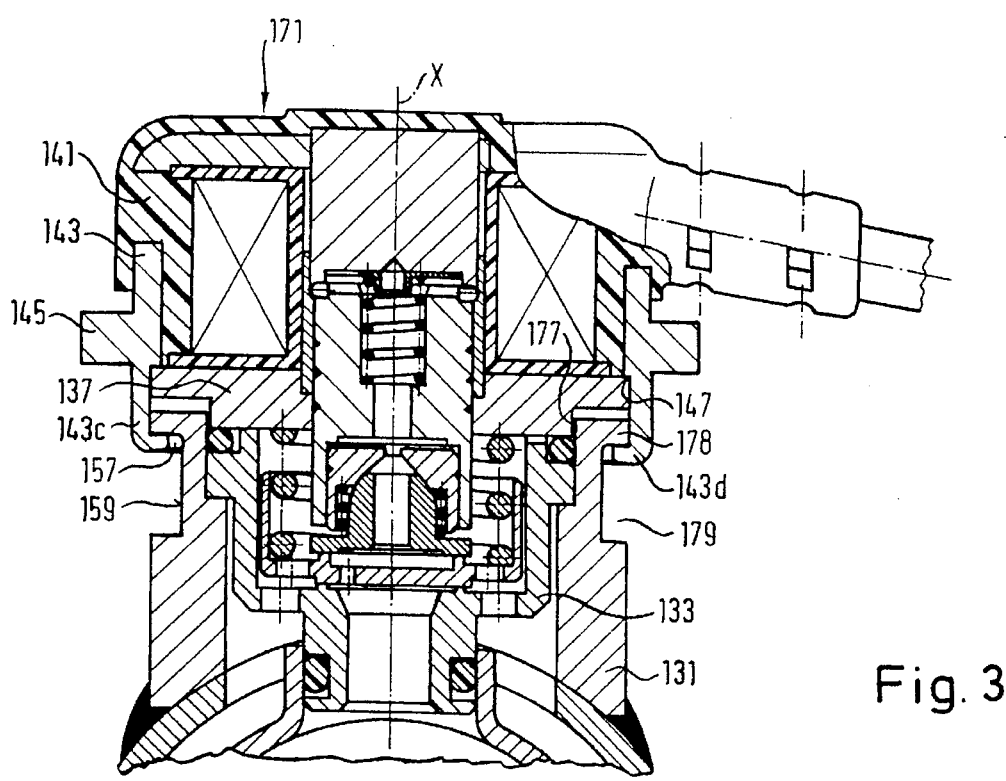
FIG. 3 shows second embodiment of a valve unit for an oscillation damper according to FIG. 1.

The embodiment of FIG. 3 is very similar to the embodiment of FIG. 2. Analogous parts are designated by the same reference numerals as in FIG. 2 increased by 100. The only difference between the embodiment of FIG. 3 and FIG. 2 lies in the connection between the cover unit 171 and the basic housing tube 131. The basic housing tube 131 is provided with a radially outwardly directed flange 178. The extension 143c of the iron jacket 143 is radially inwardly flanged below the radially outwardly directed flange 178 for providing the connection between the cover unit 171 add the basic housing tube 131. The radially outwardly directed flange 178 is obtained by providing an external circumferential groove 179 into the outer circumferential face of the basic housing tube 131. The inward flanging of the flange 143d is again made by rolling or caulking, while the cover unit 171 is pretensioned against the basic housing tube 131. It is to be noted that during this flanging operation at 143d, the upper end of the basic housing tube 131 is again radially supported at 177 by the iron flange portion 137. It is further to be noted that the radially inner end 157 of the flange 143d is spaced from the base surface 159 of the groove 179 for avoiding any misalignment.

In all other details the construction and the assembling corresponds to the embodiment of FIG. 2.

Figure 4:
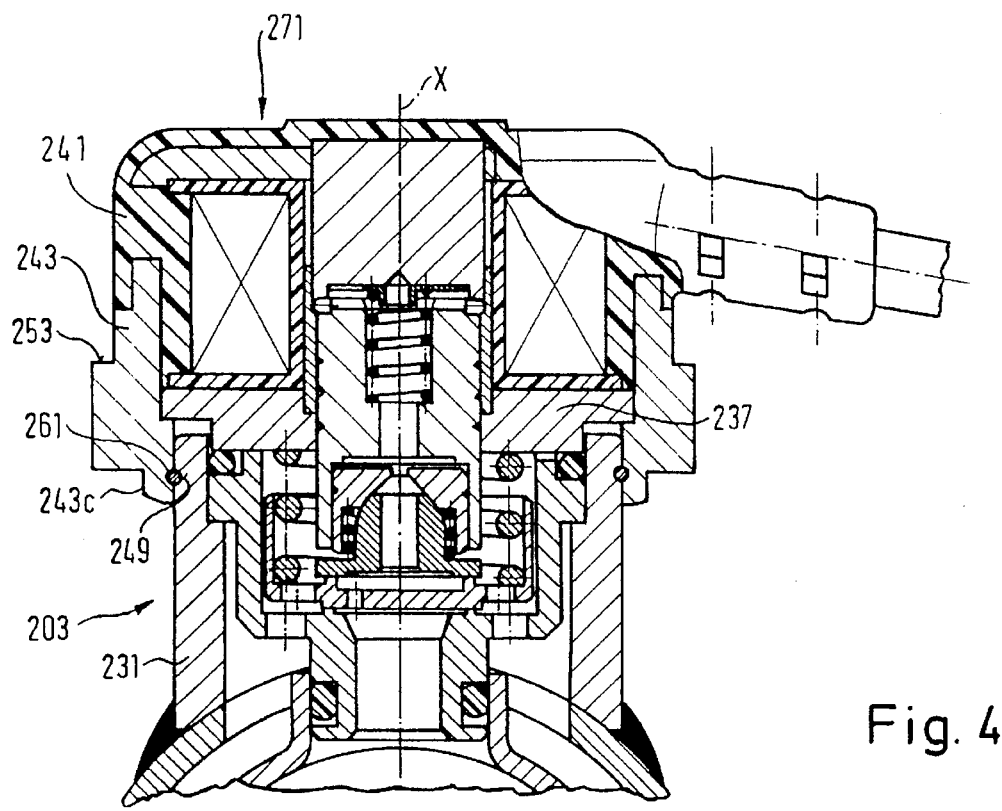
FIG. 4 shows a third embodiment of a valve unit for an oscillation damper according to FIG. 1.

A third embodiment is shown in FIG. 4. This embodiment is again very similar to the embodiment of FIGS. 1 and 2. Analogous parts are designated by the same reference numbers increased by 200. In the embodiment of FIG. 4 the iron jacket 243 is again provided with an extension 243c extending around the basic housing tube 231. A groove 249 is provided in the radially outer face of the basic housing tube 231. A locking ring 261 is inserted into the groove 249. The extension 243c of the iron jacket 243 is rolled or caulked onto the locking ring 261 for nonreleasably connecting the cover unit 241 to the basic housing tube 231. This is again made during maintaining a pretension between the cover unit 271 and the basic housing tube 231. The interengagement of the iron flange portion 237 with the iron jacket 243 again supports the extension 243c during the rolling or caulking operation.

Figure 5:
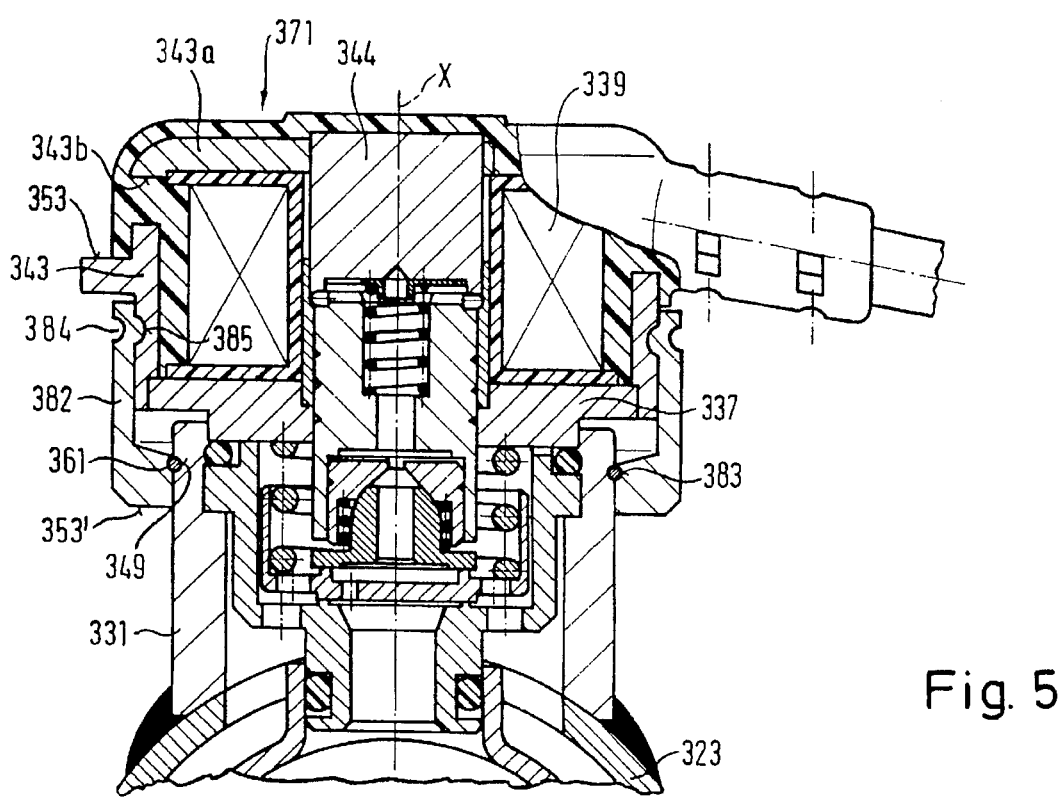
FIG. 5 shows a fourth embodiment of a valve unit for an oscillation damper according to FIG. 1.

In the embodiment of FIG. 5 which is again similar to the embodiment of FIG. 2, analogous parts are designated by the same reference numbers increased by 300. In this embodiment an interconnecting sleeve 382 is provided by connecting the cover unit 371 with the basic housing tube 331. The interconnecting sleeve 382 is axially fixed in upward direction by an abutment ring 361, which is engaged by an upwardly open groove 383 of the interconnecting sleeve 382. The abutment ring 361 is inserted into a groove 349 provided in the external circumferential face of the basic housing tube 331. The interconnecting sleeve 382 overlaps the iron jacket 343. The connection between the interconnecting sleeve 382 and the iron jacket 343 is obtained by shaping a circumferential bead 384 into a groove 385 of the iron jacket 343 while maintaining an axial pretension between the pretension surface 353 and a further pretension surface 353 of the interconnecting sleeve 382. The basic housing tube 331 is free of radial and axial forces during assembling. The iron jacket 343 and the interconnecting sleeve 382 are supported by the iron flange portion 337, when the bead 384 is made by rolling or caulking. One can see in all embodiments that a tight engagement is provided between the ferromagnetic core 44, the iron end wall 43a, the iron jacket 43 and the iron flange portion 37, such as to obtain a closed magnetic circuit around the electromagnetic coil 39. The pole tube may be soldered to the ferromagnetic core 44 and to the iron flange portion 37. A separation of the cover unit 71 from the basic housing tube 31 results in the destroying of the valve unit 3.

Figure 6:
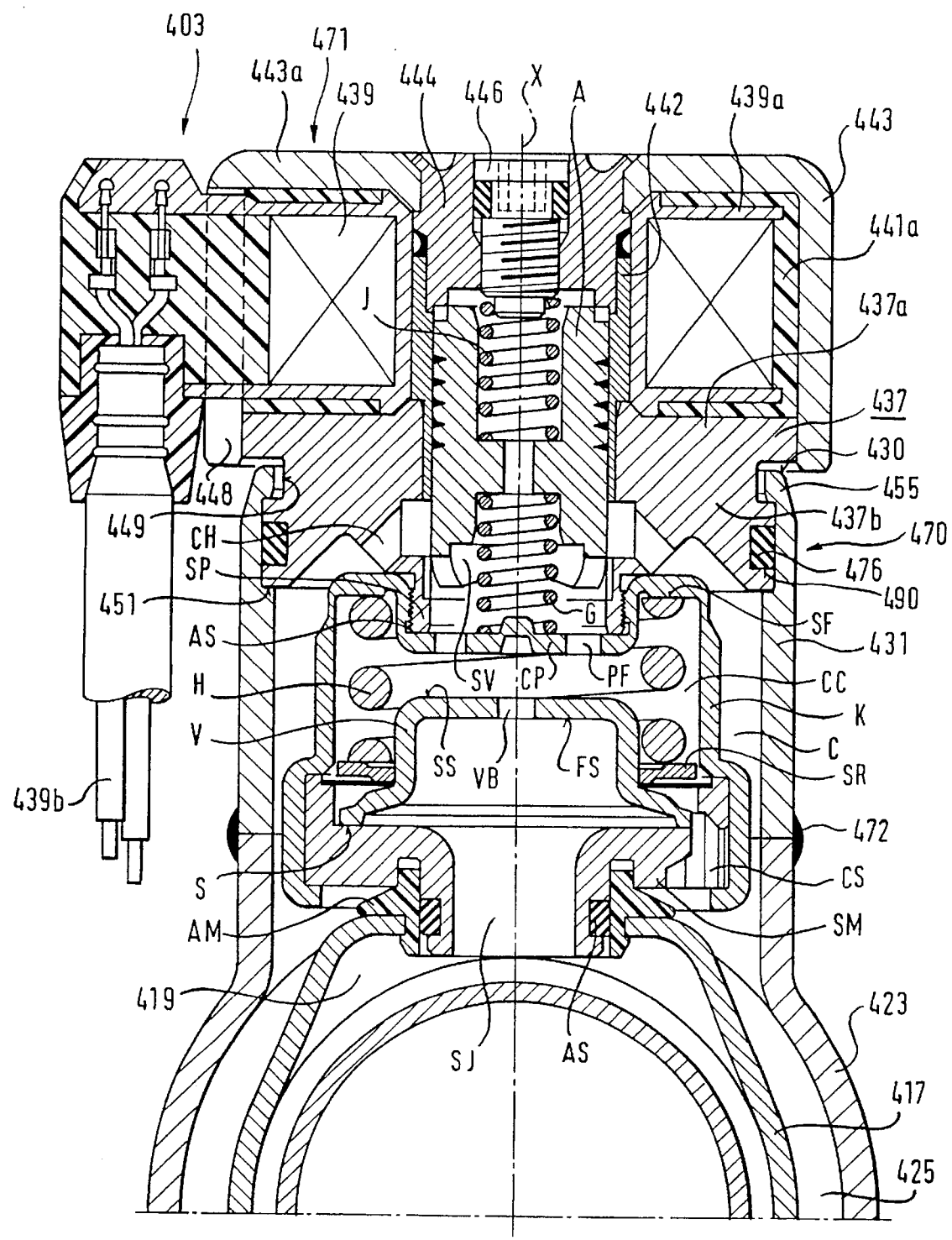
FIG. 6 shows a further embodiment of a valve unit with nonreleasable connection means between different housing units.

In FIG. 6 there is shown a further embodiment of the valve unit in many respects similar to the embodiment of FIG. 2. The embodiment of FIG. 6 may again be used as a part of the oscillation damper of FIG. 1 with the general behavior of the oscillation damper remaining unchanged as described at the beginning of the detailed description. Analogous parts are designated with the same reference numerals as in FIG. 2 increased by 400.

In the embodiment of FIG. 6 toroidal enveloping wall means 443, 443a, 444, 442 and 437 are provided by the jacket 443, the end wall portion 443a, the core member 444, the guide tube 442 and the intermediate wall member 437. The intermediate wall member 437 comprises a larger diameter portion 437a and a smaller diameter portion 437b. The larger diameter portion 437a is located axially between the magnetic coil 439 and an upper edge face 430 of the basic housing tube 431 which is welded at 472 to a branch portion of the container pipe 423. The small diameter portion 437b rests on the shoulder face 451. An upper end portion 455 of the basic housing tube 431 is permanently deformed radially inward such to engage into the groove 449 of the intermediate wall member 437 and as to nonreleasably connect the intermediate wall member 437 with the basic housing tube 431. A sealing ring 476 is accommodated within a groove 490 and is in sealing engagement with the basic housing tube 431. The jacket 443 is axially fixed and centered with respect to the intermediate wall member 437.

Figure 7:
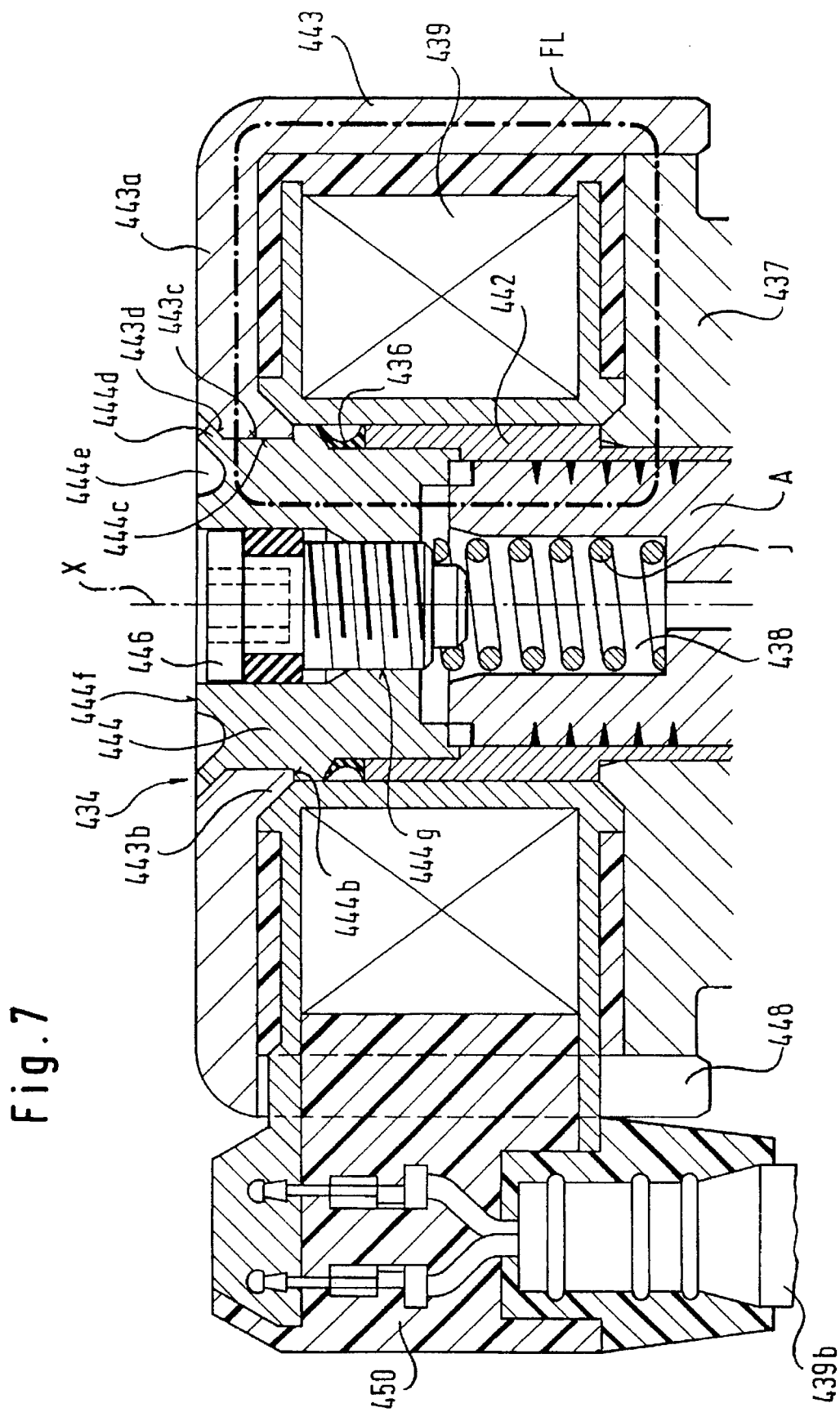
FIG. 7 shows an enlarged view of the upper portion of the valve unit of FIG. 6.

A most interesting detail of the embodiment according to FIG. 6 is shown in FIG. 7. The components in FIG. 7 are designated with the same reference numerals as in FIG. 6. The end wall portion 443a is provided in an engagement zone 434 with a radially downward directed projection 443b. This projection rests on a shoulder face 444b of the core member 444. A radially inner cylindrical engagement face 443c of the end wall portion 443a is in engagement with a radially outer counter-engagement face 444c of the core member 444. An upwardly diverging face 443d of the end wall portion 443a is engaged by an annular engagement lip 444d of the core member 444. This engagement lip 444d has been obtained by an annular recess 444e formed into the upper terminal face 444f of the core member 444. The engagement lip 444d has been bent radially outward such as to be in face-to-face engagement with the diverging face 443d of the end wall portion 443a. One can easily see that there is a large face-tight contact between the core member 444 and the end wall portion 443a, even when the wall thickness of the end wall portion 443a is relatively small.

The jacket 443, the end wall portion 443a, the core member 444 and the intermediate wall member 437 are generally made of ferromagnetic material such as to shape a concentrated electromagnetic flux FL around the toroidal electromagnetic coil 439. This flux FL is essential for exerting a high magnetic force onto the armature A. For obtaining a strong electromagnetic flux FL it is of considerable importance to have a tight contact between the end wall portion 443a and the core member 444 as explained above. It is to be noted that the guide tube 442 is preferably made of a metallic but not ferromagnetic material such as to deflect the electromagnetic flux FL through the armature A. An annular sealing element 436 may be provided at the upper end of the guide tube 442. The guide tube 442 may be welded or soldered to the armature A for common axial movement. The armature A accommodates within an axial recess 438 a first auxiliary helical compression spring J. The core member 444 is provided with an axially screwable screw 446 sealingly located within a threaded bore 444g of the core member 444. The screw member 446 provides an adjustable abutment for the auxiliary helical compression spring J which is in more detail described below. The current supply cable 439b is introduced toward the electromagnetic coil 439 through a slot 448 of the jacket 443 and is embedded into a plastic material at 450.

A further interesting aspect of the embodiment as shown in FIG. 6 is the assembly of the fluidic valve components. The hat-shaped valve member V is resting again on a valve seat S under the action of the main compression spring H. The valve seat S is provided by a valve seat member SM. This valve seat member SM is axially fixed within a cage member K. The cage member K comprises a support face SF for the upper end of the main compression spring H. The main compression spring H is prestressed between the support face SF and a support ring SR resting on the valve member V. A perforated central portion CP of the cage member K provides a support face for a further auxiliary helical compression spring G. The valve member V is provided with a throttled bore VB. The high pressure fluid path 419 is connected by an inlet bore SJ with a first side FS of the valve member V. A control chamber CC is established on the second side SS of the valve member V. The control chamber CC is connected by the throttled bore VB with the inlet bore SJ. The lower end portion of the armature A defines a secondary valve unit SV together with a downward projecting sleeve portion SP of the intermediate wall member 437. Through the secondary valve unit SV and the perforations PF of the cage member K the control chamber CC is connectable with the compartment C which compartment C is connected again with the low pressure fluid containing compensating chamber 425.

A high pressure of the fluid path 419 exists in the inlet bore SJ. This high pressure being derived from the high pressure in the upper working chamber 11a of FIG. 1. Low pressure exists in the compartment C resulting from low pressure in the low pressure fluid containing compensating chamber 25 of FIG. 1 when the valve member V is maintained in a closing position with respect to the valve seat S below a predetermined pressure in the inlet bore SJ.

As long as the secondary valve SV is closed no damping liquid can escape through the throttled bore VB, the perforations PF and the channels CH to the compartment C and thus to the compensating chamber 425. This is true in the position of the armature A as shown in FIG. 6. When the armature A is lifted with respect to the position of FIG. 6 by energizing the electromagnetic coil 439 the secondary valve unit SV is opened and liquid can flow through the throttled bore VB, the perforations PF and the channels CH toward the compensating chamber 425.

As long as the second valve unit SV is closed the pressure of the damping liquid in the control chamber CC is the same as the pressure in the inlet bore SJ. Thus, the valve member V is maintained in engagement with the valve seat S by the main compression spring H, assuming that the liquid pressure exposed faces FS and SS are substantially equal. Preferably the lower face FS may be somewhat larger than the upper face SS. When the secondary valve unit SV is opened a secondary flow of liquid exists from the inlet bore SJ through the throttled bore VB, the perforations PF, the secondary valve unit SV and the channels CH toward the compensation chamber 425. Due to the throttling function of the throttled bore VB the pressure within the control chamber CC is reduced as compared with the pressure at the first side FS of the valve member V. As soon as a certain pressure difference exists between the inlet bore SJ and the control chamber CC the valve member V can be lifted from the valve seat S such that the main flow of damping liquid is opened through the connecting space CS from the high pressure liquid containing inlet bore SJ toward the compensating chamber 425. The opening and closing behavior of the valve member V is of high importance for the damping behavior of the oscillation damper as one can easily realize.

On the other hand the closing and opening behavior depends to a high degree on the prestress which exists in the main compression spring H when the valve member V is in closed position with respect to the valve seat S. Therefore, it is essential to exactly adjust the axial precompression of the main compression spring H. The prestress of this main compression spring H depends on the axial distance between the support ring SR and the support face SF.

Figure 8:
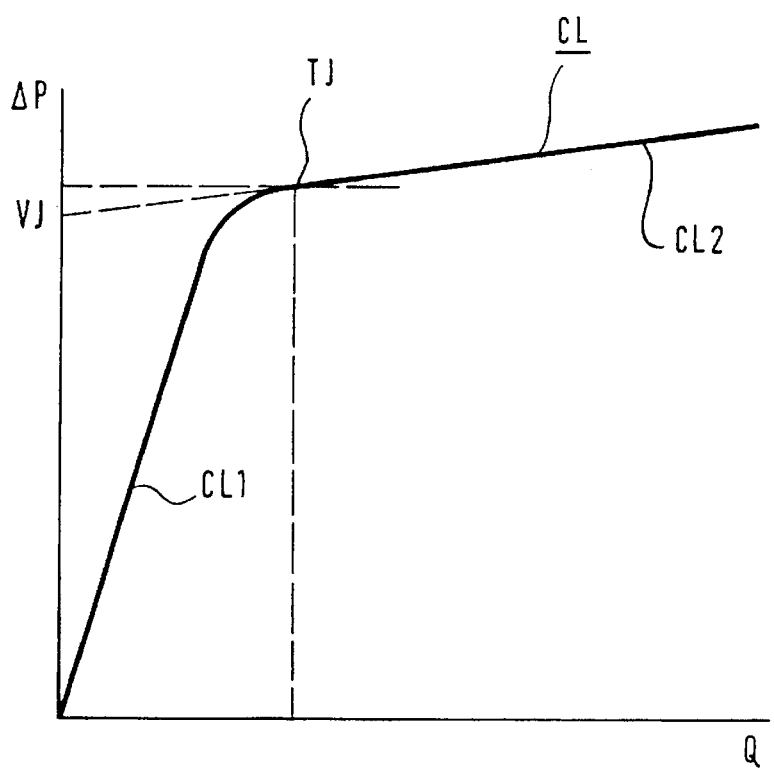
FIG. 8 shows a behavior diagram of an oscillation damper according to FIG. 6.

For better understanding it is referred now to the pressure flow rate characteristics of the valve unit of FIG. 6 which is shown in FIG. 8. The total flow rate of damping liquid from the working chamber 11a of FIG. 1 through the inlet bore SJ to the compensating chamber 425 is designated by Q and the Q-values are inserted along the horizontal axis of the graph of FIG. 8. The pressure difference ΔP between the working chamber 11a and the compensating chamber 25 is inserted along the vertical axis of the graph of FIG. 8. The line CL as shown in FIG. 8 shows approximately the relationship between the pressure difference ΔP and the flow rate Q. The left portion CL1 of the line CL corresponds to a status in which the valve member V is in its closing position on the valve seat S. The line section CL2 of the line CL corresponds to the status of the valve unit of FIG. 6 when the valve member V has been lifted from the valve seat S and a main flow of damping liquid is established between the valve member V and the valve seat S.

The total flow rate represented by the line section CL2 is substantially dependent on the flow rate of the main flow between the valve seat S and the valve member V. The virtual intersection of the line section CL2 with the vertical axis of the graph of FIG. 8 is designated by VJ. This virtual intersection is directly dependent on the prestress of the main compression spring H. On the other hand it is quite clear that the position of the virtual intersection VJ along the vertical axis of FIG. 8 is of great influence as to the location of the transition point TI between the line sections CL1 and CL2. This is the reason why one wants to precisely adjust the axial prestress of the main compression spring H.

Figure 9:
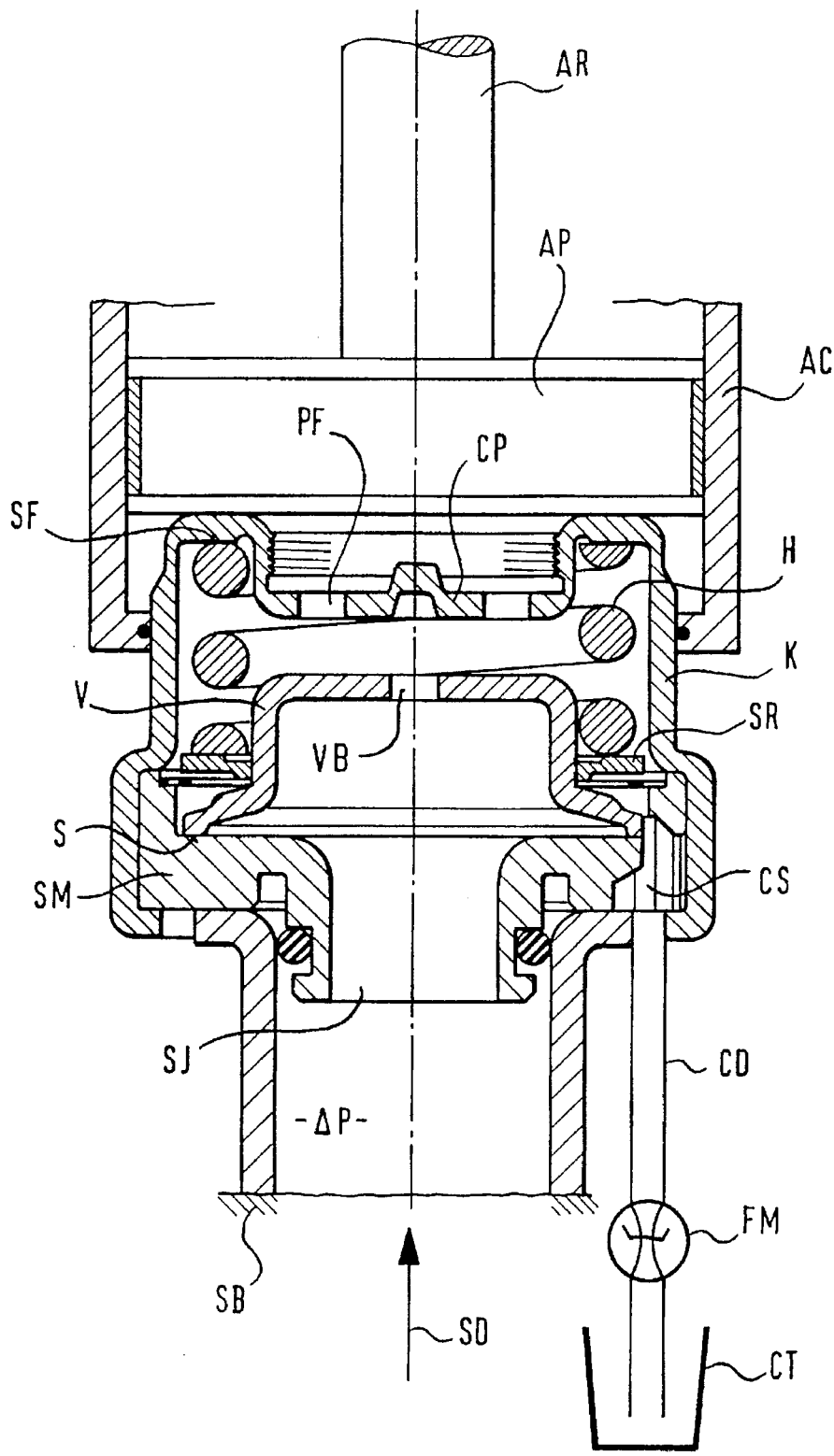
FIG. 9 shows a calibrating apparatus for calibrating the damping behavior of a valve unit according to FIG. 6.

Considering now again FIG. 6 one can easily see that the cage member K, the valve seat member SM, the main compression spring H and the support ring SR establish a preassembled unit. This preassembled unit is in more detail shown in FIG. 9. In FIG. 9 the cage member is sealingly received within an adjustment casing AC. An adjustment piston AP is sealingly guided and movable within the adjustment casing AC. An adjustment force can be exerted onto the adjustment piston AP through an adjustment rod AR. The lower end of the preassembled unit is supported by a support base SB. A source of damping liquid SD is connected to the inlet bore SJ. The connecting space CS is connected through a connecting conduit CD and a flow rate metering device FM to a collecting tank CT. The pressure difference between the pressure at the inlet bore SJ and the collecting tank CT is ΔP, assuming that the pressure in the collecting tank is atmospheric pressure. One can easily obtain the relationship between the pressure difference ΔP and the flow rate by varying this pressure difference and by measuring the flow rate at FM. If one finds that the measured relationship corresponds to a point on the line section CL2 of a wanted line CL according to FIG. 8, one has the confirmation that the prestress of the main compression spring H has the desired value. Preferably one looks for this confirmation at a measuring point quite near to the transition point of wanted line CL. If the confirmation has been obtained this is not only true for one point but it is true for all points along line section CL2.

If one finds that the measured relationship between the pressure difference ΔP and the measured total flow rate does not correspond to a point on the line section CL2 of the line CL, one knows that the prestress of the main compression spring H is not correct and must be amended by adjustment of the prestress of the main compression spring H. This can easily be done by exerting an adjustment force onto the adjustment piston AP through the adjustment rod AR. By this adjustment force the support face SF of the main compression spring H can be permanently displaced downward such as to increase the prestress of compression spring H. Then the measuring step can be repeated. This adjustment method can be repeated until the measured relationship corresponds to a point on line section CL2 of the line CL. The adjustment of the prestress of the compression spring H can be made before the subunit shown in FIG. 9 is inserted into the valve unit shown in FIG. 6.

One can see from FIG. 6 that the cage member K is centered both with respect to the intermediate wall member 437 and with respect to the intermediate pipe 417 by an adapter ring AM sealingly engaged by a sealing ring AS. Moreover, the cage member K can be axially fixed with respect to the intermediate wall member 437 by an axial securing engagement AS.

Figure 10:
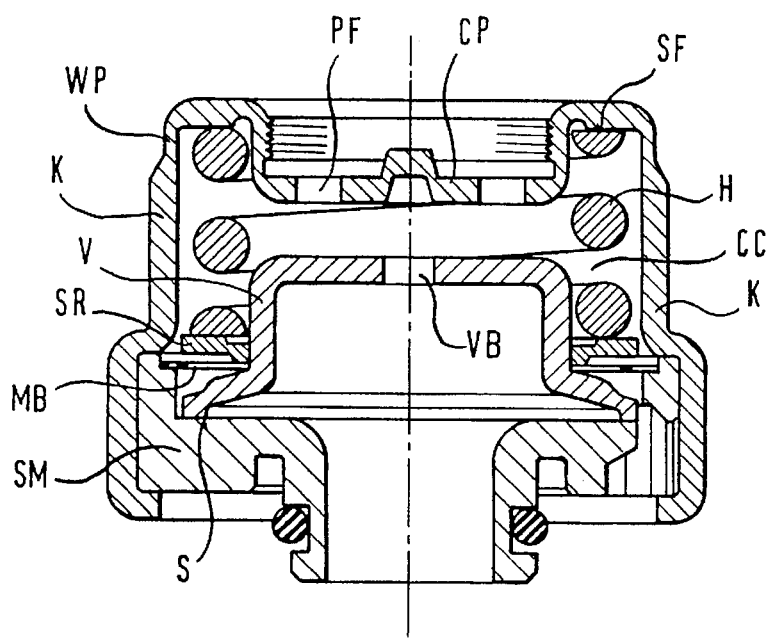
FIG. 10 shows details of a cage member of the valve unit according to FIG. 6.

From FIG. 10 one can see that the cage member K is provided with a weakened wall portion WP permitting a controlled upsetting of the cage member K. The cage member may be shaped from sheet material. It is needless to say that the weakened portion still must have enough strength that under operational condition the adjustment is not overcome. FIG. 10 shows also a membrane MB which is responsible for tightening the control chamber CC.

Figure 11A:
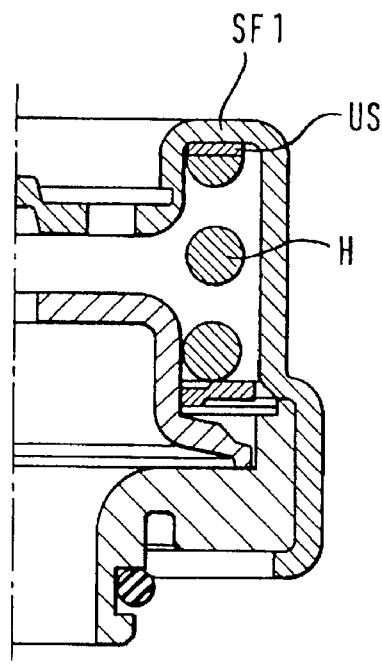
FIGS. 11a and 11b shows a further embodiment of a cage member.
Figure 11B:
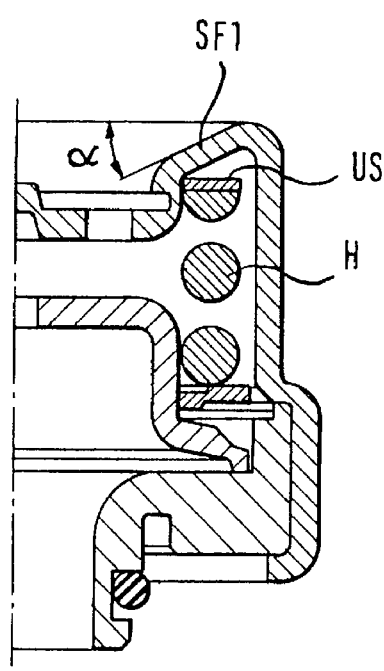

In the modified embodiment of FIGS. 11a and 11b the support face SF1 is of variable inclination α. The inclination may be modified as shown in FIG. 9. An upper support ring US is used for providing an even support for the main compression spring H even when the support face SF1 is inclined.

Figure 12A:
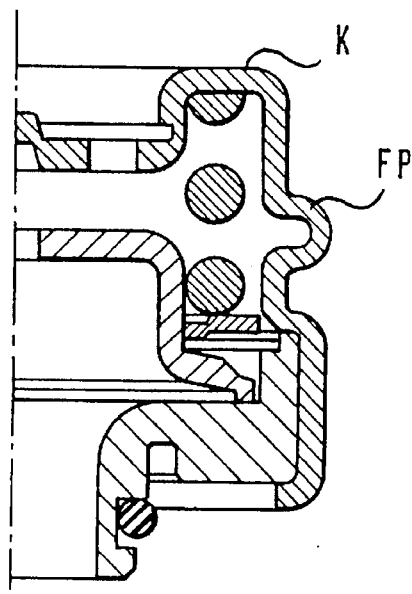
FIGS. 12a and 12b show still further embodiments of a cage member.
Figure 12B:
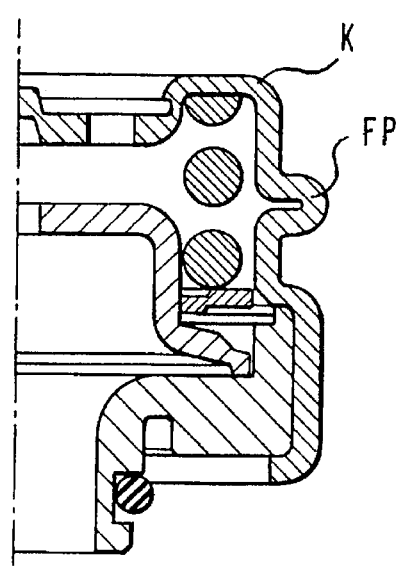

According to embodiments of FIGS. 12a and 12b the cage member K is provided with a fold portion FP the fold radius of which can be easily adjusted in a device as shown in FIG. 9. It is well understandable that the prestress can also be reduced by elongating the cage member K. Preferably one provides the cage member with an initial axial length such that the desired prestress can always be obtained by an upsetting adjustment as shown in FIG. 9.

The cage members of FIGS. 10,11a,11b,12a and 12b can be made by coldshaping. The weakened portion WP, for example, of FIG. 10 can be made in the course of coldshaping. Thus, one can use the effect of cold strengthening.

Figure 13:
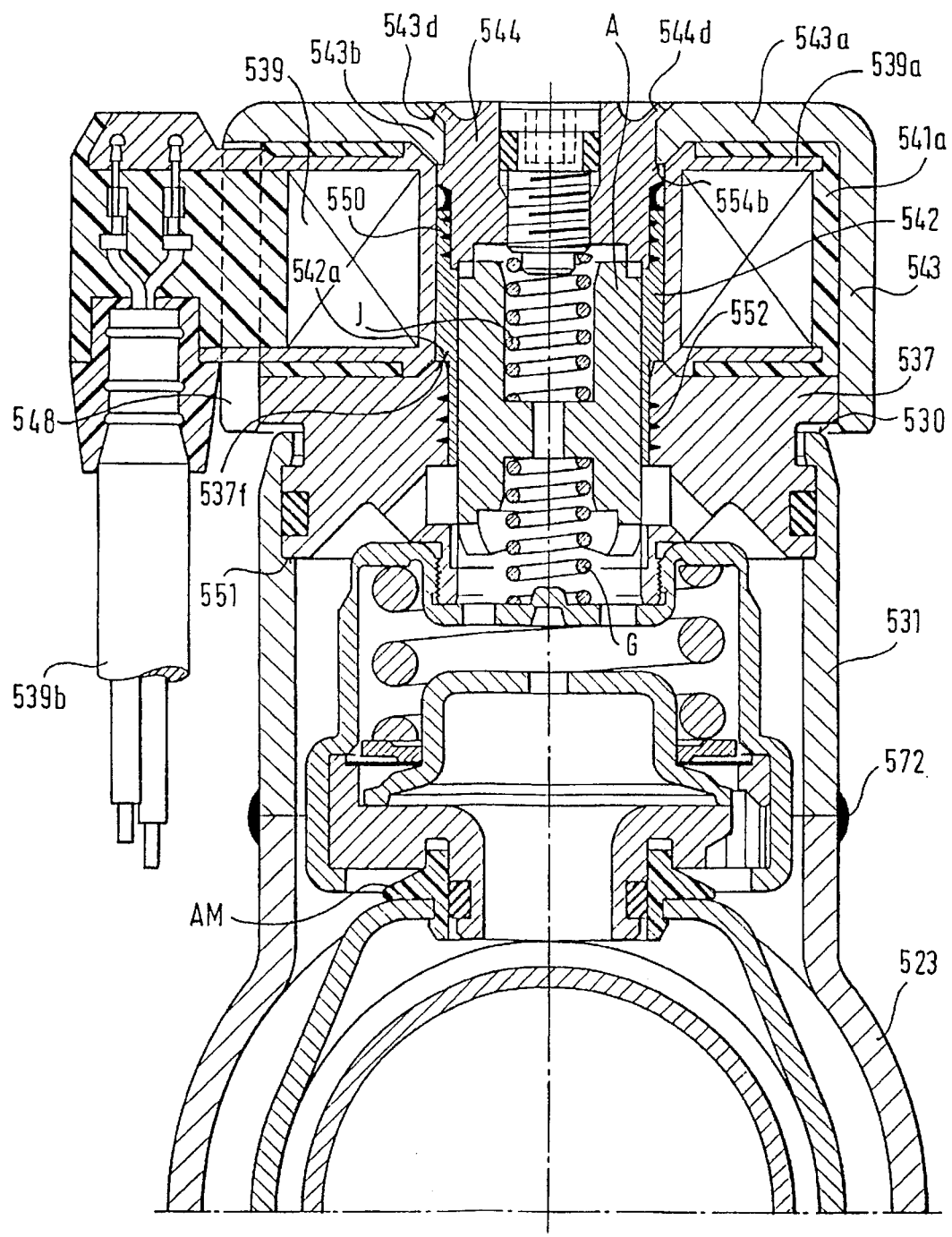
FIG. 13 shows a modified embodiment similar to the embodiment of the valve unit according to FIG. 6.

The embodiment of FIG. 13 is different from the embodiment of FIG. 6 only by a small detail: The guide tube 542 is fastened to both the core member 544 and the intermediate wall member 537 by welding or soldering. This is indicated at 550 and 552. The armature A is axially movable with respect to the guide tube 542. Here the guide tube provides an axial connection between an intermediate wall member 537 on the one hand and the end wall portion 543a on the other hand. Further details as to the design and operation of the oscillation damper as illustrated in FIGS. 6 to 13 are described in German Offenlegungsschrift 41 04 110 corresponding to European publication 0 499 183 A2 published on 13.08.1992 and U.S. Pat. No. 5,398,787.

From FIG. 14 one can understand the assembling of the embodiment according to FIG. 13 as follows:

a) the basic housing tube 531 is welded at 572 to the container pipe 523;
b) the subunit as, for example, shown in FIG. 10 is inserted into the basic housing tube 531 until engagement with the adapter AM;
c) the guide tube 542 is inserted into the intermediate wall member 537 until a shoulder face 542a engages a terminal face 537f of the intermediate wall member 537;
d) the core member 544 is inserted into the guide tube 542 until engagement of its lower end 544f with a shoulder face 542g;
e) the core member 544 and the intermediate wall member 537 are soldered to the guide tube 542 in the respective overlapping areas;
f) thus, a further subunit 544, 542, 537 is obtained;
g) the armature A and the compression springs J and G are inserted into the further the subunit 544,542,537;
h) the subassembly comprising the subunit 544,542,537, on the one hand, and the armature A, the auxiliary spring J and the auxiliary spring G, on the other hand, is inserted into the basic housing tube 531 above the first subunit as shown in FIG. 10 until the intermediate wall member 537 rests on the shoulder face 551;
i) a further subunit comprising the electromagnetic coil 539, the coating 541a and the supply line 539b is established;
k) the subunit 539,541a,539b is slided upon the guide tube 542;
l) the jacket 543 integral with the end wall portion 543a is slided upon the core member 544 and the subunit 539, 541a, 539a, 539b with the slot 548 being registered with respect to the power supply line 539b until the annular projection 543b rests on the shoulder 544b of the core member 544;
m) the lip 544d is bent against the diverging face 543d.

The adjustment method as shown in FIG. 9 makes the adjustment of the prestress of the main spring H independent of precise manufacturing of the components participating in defining the prestressed length of the spring H.

In FIG. 14 the components 543,543a, 544 and 537 are again made of ferromagnetic material whereas the guide tube 542 may be again made of nonferromagnetic material.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

The invention as described hereinabove in the context of the preferred embodiments is not to be taken as limited to all of the provided details thereof, since modifications and variations thereof may be made without departing from the spirit and scope of the invention.

We claim:

1. A fluid operated oscillation damper with an electromagnetically controlled valve unit for varying the damping force of said oscillation damper, said valve unit comprising a plurality of fluidic and electromagnetic valve unit components, at least part of said fluidic and electromagnetic valve unit components being accommodated within a valve unit compartment of said oscillation damper, said valve unit compartment being confined by compartment confining means, said compartment confining means comprising at least two housing units, one of said housing units being a basic housing unit attached to a part of said oscillation damper, a further one of said housing units being a cover unit attached to said basic housing unit, said cover unit being nonreleasably connected by nonreleasable connection means with said basic housing unit;

said cover unit being partially made of metallic material and partially made of plastics material;

said non-releasable connecting means being distributed along a circle extending around an axis of said valve unit compartment;

said non-releasable connecting means connects said basic housing unit and said metallic material of said cover unit; and said non-releasable connecting means is provided between said basic housing unit and said metallic material of said cover unit.

2. A fluid operated oscillation damper as set forth in claim 1, said cover unit being connected to said basic housing unit by positively interengaging locking means.

3. A fluid operated oscillation damper as set forth in claim 1, said connecting means comprising at least two sleeve-shaped portions overlapping each other in an axial direction along a common axis, said sleeve-shaped portions being connected with each other, one of said sleeve-shaped portions being a radially inner sleeve-shaped portion, and the other one of said sleeve-shaped portions being a radially outer sleeve-shaped portion.

4. A fluid operated oscillation damper as set forth in claim 3, said radially inner sleeve-shaped portion being provided with a circumferential groove within a radially outer surface thereof, said radially outer sleeve-shaped portion being provided with a radially inward displaced circumferential bead engaged into said circumferential groove.

5. A fluid operated oscillation damper as set forth in claim 3, said radially inner sleeve-shaped portion being provided with radially outward directed locking flange means, said radially outer sleeve-shaped portion being provided with radially inward directed locking flange means bent behind said radially outward directed locking flange means.

6. A fluid operated oscillation damper as set forth in claim 5, at least one of said radially outward directed locking flange means and said radially inward directed locking flange means being circumferentially continuous locking flange means.

7. A fluid operated oscillation damper as set forth in claim 3, said radially inner sleeve-shaped portion and said radially outer sleeve-shaped portion being locked to each other by a locking ring located radially between a radially outer circumferential face of said radially inner sleeve-shaped portion and a radially inner circumferential face of said radially outer sleeve-shaped portion, said locking ring being embossed into both said radially inner and said raidally outer circumferential face.

8. A fluid operated oscillation damper as set forth in claim 3, said radially inner sleeve-shaped portion being a part of said basic housing unit, said radially outer sleeve-shaped portion being a part of said cover unit.

9. A fluid operated oscillation damper as set forth in claim 1, both said basic housing unit and said cover unit having respective radially outer circumferential faces circumferentially extending about a substantially common axis and axially adjacent each other, both said circumferential faces of said basic housing unit and said cover unit being axially overlapped by an interconnecting sleeve, said interconnecting sleeve being in locking engagement with both said circumferential faces of said basic housing unit and said cover unit, respectively.

10. A fluid operated oscillation damper as set forth in claim 9, said interconnecting sleeve being locked to at least one of said radially outer circumferential faces by a ring member effecting a locking engagement in at least one axial direction.

11. A fluid operated oscillation damper as set forth in claim 9, said interconnecting sleeve being locked to at least one of said radially outer circumferential faces by a circumferential radially inward directed locking bead engaging into a circumferential locking groove provided in said at least one radially outer circumferential face.

12. A fluid operated oscillation damper as set forth in claim 9, both said cover unit and said interconnecting sleeve being provided with pretension application means permitting pretensioning of said cover unit toward said basic housing unit after having locked said interconnecting sleeve to said radially outer surface of said basic housing unit and before locking it to said radially outer surface of said cover unit.

13. A fluid operated oscillation damper as set forth in claim 1, sealing means being provided between said basic housing unit and said cover unit, said sealing means being maintained in sealing position by said nonreleasable connecting means.

14. A fluid operated oscillation damper as set forth in claim 1, said basic housing unit having tubular shape and being fastened by one of its ends to a container tube member of said oscillation damper, the other end of said tubular basic housing unit being connected to said cover unit.

15. A fluid operated oscillation damper as set forth in claim 1, said basic housing unit and said cover unit having a common axis, said cover unit accommodating an annular electromagnetic coil around said axis and an axially movable armature member inside a central space surrounded by said annular electromagnetic coil.

16. A fluid operated oscillation damper as set forth in claim 15, said electromagnetic coil being provided with ferromagnetic core means substantially following a path substantially toroidally extending around said annular electromagnetic coil, said ferromagnetic core means comprising a ferromagnetic flange portion provided axially adjacent said annular electromagnetic coil and said basic housing unit.

17. A fluid operated oscillation damper as set forth in claim 16, said ferromagnetic core means further comprising a ferromagnetic jacket surrounding said annular electromagnetic soil and integral with a ferromagnetic end wall adjacent an end face of said annular electromagnetic coil remote from said ferromagnetic flange portion, said ferromagnetic jacket providing a portion of said cover unit nonreleasably connected to said basic housing unit.

18. A fluid operated oscillation damper as set forth in claim 17, said ferromagnetic end wall having a central opening axially aligned with said central space, a central ferromagnetic core member being located inside said central opening and extending into said central space, said central opening being closed by a plastics material layer of said cover unit, said plastics material layer covering said ferromagnetic end wall and at least part of said ferromagnetic jacket.

19. A fluid operated oscillation damper as set forth in claim 18, said plastics material layer of said cover unit extending through openings of said ferromagnetic jacket and being integral with a plastics material jacket surrounding said annular electromagnetic coil at least on a radially outer circumferential side thereof.

20. A fluid operated oscillation damper as set forth in claim 19, said ferromagnetic flange portion being in axial engagement with a substantially axially directed engagement face of said ferromagnetic jacket.

21. A fluid operated oscillation damper as set forth in claim 20, said ferromagnetic flange portion being maintained in axial engagement with said engagement face by said nonreleasable connecting means.

22. A fluid operates oscillation damper as set forth in claim 19, said plastics material jacket forming together with a radially outward open annular coil carrier a coil housing for said annular electromagnetic coil.

23. A fluid operated oscillation damper as set forth in claim 16, said ferromagnetic flange portion being axially supported by a valve components housing axially supported inside said basic housing unit and open toward said central space such as to expose the valve unit components inside said valve components housing to said armature member.

24. A fluid operated oscillation damper as set forth in claim 23, sealing means being provided for sealing said valve components housing with respect to said ferromagnetic flange portion and said basic housing unit.

25. A fluid operated oscillation damper as set forth in claim 1, said cover unit being provided with pretension application means permitting pretensioning of said cover unit toward said basic housing unit during connecting said cover unit to said basic housing unit.

26. A fluid operated oscillation damper as set forth in claim 25, said basic housing unit being provided with further pretension application means.

27. A fluid operated oscillation damper as claimed in claim 1, said nonreleasable connection means comprising an overlapping sleeve portion overlapping a radially outward circumferential face of a metallic portion of said cover unit and being provided with radially inward directed projection means shaped into recess means of said radially outward circumferential face for nonreleasable engagement therewith.

28. A fluid operated oscillation damper with an electromagnetically controlled valve unit for varying the damping force of said oscillation damper, said valve unit comprising a plurality of fluidic and electromagnetic valve unit components, at least part of said fluidic and electromagnetic valve unit components being accommodated within a valve unit compartment of said oscillation damper, said valve unit compartment being confined by compartment confining means, said compartment confining means comprising at least two housing units, one of said housing units being a basic housing unit attached to a part of said oscillation damper, a further one of said housing units being a cover unit attached to said basic housing unit, said cover unit being nonreleasably connected by nonreleasable connection means with said basic housing unit;

said basic housing unit and said cover unit having a common axis, said cover unit accommodating an annular electromagnetic coil around said axis and an axially movable armature member inside a central space surrounded by said annular electromagnetic coil;

said electromagnetic coil being provided with ferromagnetic core means substantially following a path substantially toroidally extending around said annular electromagnetic coil, said ferromagnetic core means comprising a ferromagnetic flange portion provided axially adjacent said annular electromagnetic coil and said basic housing unit; and said ferromagnetic core means further comprising a ferromagnetic jacket surrounding said annular electromagnetic coil and integral with a ferromagnetic end wall adjacent an end face of said annular electromagnetic coil remote from said ferromagnetic flange portion, said ferromagnetic jacket providing a portion of said cover unit nonreleasably connected to said basic housing unit.

29. A fluid operated oscillation damper as set forth in claim 28, said cover unit being connected to said basic housing unit by positively interengaging locking means.

30. A fluid operated oscillation damper as set forth in claim 28, said connecting means comprising at least two sleeve-shaped portions overlapping each other in an axial direction along a common axis, said sleeve-shaped portions being connected with each other, one of said sleeve-shaped portions being a radially inner sleeve-shaped portion, and the other one of said sleeve-shaped portions being a radially outer sleeve-shaped portion.

31. A fluid operated oscillation damper as set forth in claim 30, said radially inner sleeve-shaped portion being provided with a circumferential groove within a radially outer surface thereof, said radially outer sleeve-shaped portion being provided with a radially inward displaced circumferential bead engaged into said circumferential groove.

32. A fluid operated oscillation damper as set forth in claim 30, said radially inner sleeve-shaped portion being provided with radially outward directed locking flange means, said radially outer sleeve-shaped portion being provided with radially inward directed locking flange means bent behind said radially outward directed locking flange means.

33. A fluid operated oscillation damper as set forth in claim 32, at least one of said radially outward directed locking flange means and said radially inward directed locking flange means being circumferentially continuous locking flange means.

34. A fluid operated oscillation damper as set forth in claim 30, said radially inner sleeve-shaped portion and said radially outer sleeve-shaped portion being locked to each other by a locking ring located radially between a radially outer circumferential face of said radially inner sleeve-shaped portion and a radially inner circumferential face of said radially outer sleeve-shaped portion, said locking ring being embossed into both said radially inner and said raidally outer circumferential face.

35. A fluid operated oscillation damper as set forth in claim 30, said radially inner sleeve-shaped portion being a part of said basic housing unit, said radially outer sleeve-shaped portion being a part of said cover unit.

36. A fluid operated oscillation damper as set forth in claim 28, both said basic housing unit and said cover unit having respective radially outer circumferential faces circumferentially extending about a substantially common axis and axially adjacent each other, both said circumferential faces of said basic housing unit and said cover unit being axially overlapped by an interconnecting sleeve, said interconnecting sleeve being in locking engagement with both said circumferential faces of said basic housing unit and said cover unit, respectively.

37. A fluid operated oscillation damper as set forth in claim 36, said interconnecting sleeve being locked to at least one of said radially outer circumferential faces by a ring member effecting a locking engagement in at least one axial direction.

38. A fluid operated oscillation damper as set forth in claim 36, said interconnecting sleeve being locked to at least one of said radially outer circumferential faces by a circumferential radially inward directed locking bead engaging into a circumferential locking groove provided in said at least one radially outer circumferential face.

39. A fluid operated oscillation damper as set forth in claim 36, both said cover unit and said interconnecting sleeve being provided with pretension application means permitting pretensioning of said cover unit toward said basic housing unit after having locked said interconnecting sleeve to said radially outer surface of said basic housing unit and before locking it to said radially outer surface of said cover unit.

40. A fluid operated oscillation damper as set forth in claim 28, sealing means being provided between said basic housing unit and said cover unit, said sealing means being maintained in sealing position by said nonreleasable connecting means.

41. A fluid operated oscillation damper as set forth in claim 28, said basic housing unit having tubular shape and being fastened by one of its ends to a container tube member of said oscillation damper, the other end of said tubular basic housing unit being connected to said cover unit.

42. A fluid operated oscillation damper as set forth in claim 28, said cover unit being partially made of metallic material and partially made of plastics material, said nonreleasable connecting means being provided between said basic housing unit and said metallic material of said cover unit.

43. A fluid operated oscillation damper as set forth in claim 28, said ferromagnetic end wall having a central opening axially aligned with said central space, a central ferromagnetic core member being located inside said central opening and extending into said central space, said central opening being closed by a plastics material layer of said cover unit, said plastics material layer covering said ferromagnetic end wall and at least part of said ferromagnetic jacket.

44. A fluid operated oscillation damper as set forth in claim 43, said plastics material layer of said cover unit extending through openings of said ferromagnetic jacket and being integral with a plastics material jacket surrounding said annular electromagnetic coil at least on a radially outer circumferential side thereof.

45. A fluid operates oscillation damper as set forth in claim 44, said plastics material jacket forming together with a radially outward open annular coil carrier a coil housing for said annular electromagnetic coil.

46. A fluid operated oscillation damper as set forth in claim 28, said ferromagnetic flange portion being in axial engagement with a substantially axially directed engagement face of said ferromagnetic jacket.

47. A fluid operated oscillation damper as set forth in claim 46, said ferromagnetic flance portion being maintained in axial engagement with said engagement face by said nonreleasable connecting means.

48. A fluid operated oscillation damper as set forth in claim 28, said ferromagnetic flange portion being axially supported by a valve components housing axially supported inside said basic housing unit and open toward said central space such as to expose the valve unit components inside said valve components housing to said armature member.

49. A fluid operated oscillation damper as set forth in claim 48, sealing means being provided for sealing said valve components housing with respect to said ferromagnetic flange portion and said basic housing unit.

50. A fluid operated oscillation damper as set forth in claim 28, said cover unit being provided with pretension application means permitting pretensioning of said cover unit toward said basic housing unit during connecting said cover unit to said basic housing unit.

51. A fluid operated oscillation damper as set forth in claim 50, said basic housing unit being provided with further pretension application means.

52. A fluid operated oscillation damper as set forth in claim 28, said intermediate wall member comprising axially adjacent each other a larger diameter portion located axially between a terminal ring face of said basic housing unit and said annular electromagnetic coil and a smaller diameter portion accommodated by said basic housing unit and radially centered with respect thereto.

53. A fluid operated oscillation damper as claimed in claim 28, said nonreleasable connection means comprising an overlapping sleeve portion overlapping a radially outward circumferential face of said cover unit and being provided with radially inward directed projection means shaped into recess means of said radially outward circumferential face for nonreleasable engagement therewith.

54. A fluid operated oscillation damper as set forth in claim 53, said radially outward circumferential face and said recess means being provided by said ferromagnetic core means.

55. A fluid operated oscillation damper with an electromagnetically controlled valve unit for varying the damping force of said oscillation damper, said valve unit comprising a plurality of fluidic and electromagnetic valve unit components, at least part of said fluidic and electromagnetic valve unit components being accommodated within a valve unit compartment of said oscillation damper, said valve unit compartment being confined by compartment confining means, said compartment confining means comprising at least two housing units, one of said housing units being a basic housing unit (431) attached to a part of said oscillation damper, a further one of said housing units being a cover unit, said cover unit being connected by connection means with said basic housing unit; said basic housing unit and said cover unit having a common axis, said cover unit accommodating an annular electromagnetic coil around said axis and an axially movable armature member inside a central space surrounded by said annular electromagnetic coil; said electromagnetic coil being provided with enveloping wall means substantially following a path extending substantially toroidally around said annular electromagnetic coil, said enveloping wall means comprising an annular intermediate wall member around and substantially orthogonal with respect to said common axis and located axially adjacent a transition zone between said annular electromagnetic coil and said basic housing unit; said enveloping wall means further comprising a jacket surrounding a radially outward face of said annular electromagnetic coil and integral with an end wall portion adjacent an end face of said annular electromagnetic coil remote from said annular intermediate wall member, said jacket providing a portion of said cover unit.

56. A fluid operated oscillation damper according to claim 55, wherein:

said enveloping wall means further comprises a central core member fastened with respect to said end wall portion by nonreleasable fastening means, said nonreleasable fastening means being provided in an annular engagement zone between a radially inner edge zone of said end wall portion on the one hand and a terminal portion of said central core member on the other hand, said radially inner edge zone of said end wall portion having an axially directed annular projection axially supported by an annular shoulder face of said central core member, a radially inner substantially cylindrical engagement face engaging a radially outer substantially cylindrical counter-engagement face of said central core member and a radially inner diverging face diverging in an axial direction away from said annular projection and being in face-to-face engagement with a correspondingly diverging annular engagement lip of said central core member.

57. A fluid operated oscillation damper as set forth in claim 51, said annular engagement lip being the result of shaping a substantially axial impression into a terminal face of said central core member radially adjacent to said radially outer substantially cylindrical counter-engagement face, said lip being bent into face-to-face engagement with said radially inner diverging face of said end wall portion.

58. A fluid operated oscillation damper as set forth in claim 56, said annular enveloping wall means comprising a guide sleeve, said armature member being axially guided by said guide sleeve.

59. A fluid operated oscillation damper as set forth in claim 58, said guide sleeve being fastened to at least one of said annular intermediate wall member and said central core member.

60. A fluid operated oscillation damper as set forth in claim 58, said guide sleeve being made of a nonferromagnetic material.

61. A fluid operated oscillation damper as set forth in claim 56, said central core member accommodating a substantially axial directed and axially screwable adjustment screw providing an abutment face for a first auxiliary helical compression spring located on said armature member.

62. A fluid operated oscillation damper as set forth in claim 56, said electromagnetic coil being coated with internal coating means inside said enveloping wall means.

63. A fluid operated oscillation damper as set forth in claim 56, said jacket being provided with a recess for introduction of power supply line means from the exterior of said valve unit compartment toward said electromagnetic coil.

64. A fluid operated oscillation damper as set forth in claim 56, said cover unit being nonreleasably connected by nonreleasable connection means with said basic housing unit.

65. A fluid operated oscillation damper as set forth in claim 64, said annular intermediate wall member comprising axially adjacent to each other a larger diameter portion and a smaller diameter portion, said larger diameter portion being located axially between a terminal ring face of said basic housing unit and said electromagnetic coil and being in radially centering engagement with a radially inner circumferential face of said jacket, said smaller diameter portion being accommodated by said basic housing unit and fastened therein with a radially centered relationship thereto.

66. A fluid operated oscillation damper as set forth in claim 65, said smaller diameter portion being axially supported on a substantially axially directed shoulder face of said basic housing unit.

67. A fluid operated oscillation damper as set forth in claim 66, said basic housing unit having integral therewith a terminal fastening sleeve portion surrounding said smaller diameter portion of said annular intermediate wall member and being bent in radial inward direction for nonreleasable engagement into a radially outer annular recess of said smaller diameter portion.

68. A fluid operated oscillation damper as set forth in claim 67, an annular sealing member being provided radially between said terminal fastening sleeve portion and said smaller diameter portion.

69. A fluid operated oscillation damper as set forth in claim 68, said annular sealing member being accommodated by an annular recess provided by said smaller diameter portion.

70. A fluid operated oscillation damper as set forth in claim 56, said enveloping wall means comprising ferromagnetic material.

71. A fluid operated oscillation damper as set forth in claim 70, said annular intermediate wall member, said jacket, said end wall portion and said central core member being made of ferromagnetic material.

72. A fluid operated oscillation damper as set forth in claim 56, said electromagnetically controlled valve unit comprising cage means and—carried by said cage means—a main valve seat, a main valve member and a main compression spring, said main compression spring being axially precompressed between a support face and an engagement face carried by said main valve member, said main compression spring urging said main valve member toward said main valve seat, said main valve seat being fixed with respect to said cage means, said cage means being radially centered with respect to said annular intermediate wall member and with respect to high pressure fluid conducting means permitting high pressure fluid flow towards a first side of said main valve member remote from said main compression spring, said main valve member permitting—when lifted from said main valve seat (S)—high pressure fluid flow towards low pressure fluid conducting means.

73. A fluid operated oscillation damper as set forth in claim 72, said cage means being axially fixed with respect to said annular intermediate wall member.

74. A fluid operated oscillation damper as set forth in claim 72, said cage means confining a control chamber adjacent a second side of said main valve member remote from said first side of said main valve member, said main valve member being in parallel with a throttled fluid bypass extending between said high pressure fluid conducting means and said control chamber, said control chamber being connectable by secondary valve means with said low pressure fluid conducting means, said secondary valve means being controllable by said armature member.

75. A fluid operated oscillation damper as set forth in claim 72, said cage means, said main valve seat, said main compression spring and said main valve member being preassembled as a preassembled subunit of said electromagnetically controlled valve unit.

76. A fluid operated oscillation damper as set forth in claim 75, said preassembled subunit comprising biasing force adjustment means for adjusting the biasing force of said main compression spring acting onto said main valve member.

77. A fluid operated oscillation damper as set forth in claim 76, said biasing force adjustment means comprising a permanently deformable support face for said main compression spring.

78. A fluid operated oscillation damper as set forth in claim 77, said permanently deformable support face being integral with a permanently deformable cage member of said cage means.

79. A fluid operated oscillation damper according to claim 55, wherein:

said enveloping wall means further comprises a central core member fixed with respect to said end wall portion, said electromagnetically controlled valve unit comprising cage means and—carried by said cage means—a main valve seat, a main valve member and a main compression spring, said main compression spring being axially precompressed between a support face and an engagement face carried by said main valve member, said main compression spring urging said main valve member toward said main valve seat, said main valve seat being fixed with respect to said cage means, said cage means being radially centered with respect to said annular intermediate wall member and with respect to high pressure fluid conducting means permitting fluid flow towards a first side of said main valve member remote from said main compression spring, said main valve member permitting—when lifted from said main valve seat—fluid flow from said high pressure fluid conducting means towards low pressure fluid conducting means, said cage means, said main valve seat, said main valve member and said main compression spring establishing a preassembled subunit comprising plastically deformable adjusting means for a prestress of said main compression spring.

* * * * *

UNITED STATES PATENT AND TRADEMARK OFFICE
CERTIFICATE OF CORRECTION

PATENT NO. : 5,651,433                 Page 1 of 2
DATED : July 29, 1997
INVENTOR(S) : Alfred WIRTH, Andreas FÖRSTER, Günther HANDKE, and Andreas ZIETSCH It is certified that error appears in the above-identified patent and that said Letters Patent is hereby corrected as shown below:

In column 1, line 48, before '920' insert --24--.

In column 6, line 34, before 'and', delete "band," and insert --hand,--.

In column 6, line 38, after 'application', delete "means in" and insert --means. In--.

In column 11, line 15, after '171', delete "add" and insert --and--.

In column 11, line 62, after 'surface', delete "353" and insert --353'--.

UNITED STATES PATENT AND TRADEMARK OFFICE
CERTIFICATE OF CORRECTION

PATENT NO. : 5,651,433
DATED : July 29, 1997
INVENTOR(S) : Alfred WIRTH, Andreas FÖRSTER, Günther HANDKE, and Andreas ZIETSCH It is certified that error appears in the above-identified patent and that said Letters Patent is hereby corrected as shown below:

In column 16, line 27, after 'further' delete "the".

In column 18, lines 53-54, Claim 17, after 'electromagnetic', delete "soil" and insert --coil--.

In column 21, line 55, Claim 47, after 'ferromagnetic', delete "flance" and insert --flange--.

In column 23, line 13, Claim 57, after 'claim', delete "51," and insert --56,--.

Signed and Sealed this

Twenty-eighth Day of April, 1998

Attest:

BRUCE LEHMAN

Attesting Officer

Commissioner of Patents and Trademarks